(12) United States Patent
Takeuchi et al.

(10) Patent No.: US 11,821,795 B2
(45) Date of Patent: Nov. 21, 2023

(54) SEMICONDUCTOR DEVICE, ELECTRONIC DEVICE AND ELECTRONIC SYSTEM

(71) Applicant: RENESAS ELECTRONICS CORPORATION, Tokyo (JP)

(72) Inventors: Kan Takeuchi, Tokyo (JP); Yoshio Takazawa, Tokyo (JP); Fumio Tsuchiya, Tokyo (JP); Daisuke Oshida, Tokyo (JP); Naoya Ota, Tokyo (JP); Masaki Shimada, Tokyo (JP); Shinya Konishi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 688 days.

(21) Appl. No.: 17/009,849

(22) Filed: Sep. 2, 2020

(65) Prior Publication Data
US 2021/0080330 A1    Mar. 18, 2021

(30) Foreign Application Priority Data

Sep. 17, 2019 (JP) ................................ 2019-168868

(51) Int. Cl.
  *G01K 1/024* (2021.01)
  *G01K 7/01* (2006.01)
  *G08C 17/02* (2006.01)
  *H02P 29/68* (2016.01)

(52) U.S. Cl.
  CPC ............ *G01K 1/024* (2013.01); *G01K 7/015* (2013.01); *G08C 17/02* (2013.01); *H02P 29/68* (2016.02)

(58) Field of Classification Search
  CPC ............ G01K 1/00; G01K 1/02; G01K 1/024; G01K 7/00; G01K 7/01; G01K 7/015;
  (Continued)

(56) References Cited

U.S. PATENT DOCUMENTS

2005/0071090 A1    3/2005   Katou
2013/0147501 A1    6/2013   Yamagishi
(Continued)

FOREIGN PATENT DOCUMENTS

DE    102014206621 A1    10/2015
JP         08-51768 A     2/1996
(Continued)

OTHER PUBLICATIONS

Extended European Search Report issued in corresponding European Patent Application No. 20196513.4-1216, dated Feb. 15, 2021.
(Continued)

*Primary Examiner* — Hoai-An D. Nguyen
(74) *Attorney, Agent, or Firm* — McDermott Will & Emery LLP

(57) ABSTRACT

A semiconductor device according to an embodiment includes a holding circuit including a buffer configured to obtain a heat stress information having a temperature dependency every predetermined period and a stress counter configured to accumulate the heat stress information and hold the accumulated value as a cumulative stress count value, a control circuit including an operation determination threshold value, and a wireless communication circuit. According to the semiconductor device according to the embodiment, while reducing the power consumption, it is possible to wirelessly transmit the cumulative heat stress information.

19 Claims, 18 Drawing Sheets

(58) Field of Classification Search
CPC .......... G01K 7/32; G08C 17/00; G08C 17/02;
H02P 29/00; H02P 29/60; H02P 29/68;
Y02D 10/00; G06F 1/00; G06F 1/26;
G06F 1/32; G06F 1/3203; G06F 1/3206;
G06F 1/3228; G06F 1/3234; G06F 1/324;
G06F 30/00; G06F 30/30; G06F 30/32;
G06F 30/33; G06F 30/3308; G06F
2119/00; G06F 2119/04; G06F 2119/08;
G06F 2119/14
USPC ................ 324/500, 537, 600, 649, 691, 719
See application file for complete search history.

(56) References Cited

U.S. PATENT DOCUMENTS

| | | |
|---|---|---|
| 2017/0187358 A1 | 6/2017 | Takeuchi et al. |
| 2018/0156859 A1 | 6/2018 | Takeuchi et al. |
| 2019/0154518 A1 | 5/2019 | Takeuchi et al. |

FOREIGN PATENT DOCUMENTS

| | | | | |
|---|---|---|---|---|
| JP | 2004-112767 A | | 4/2004 | |
| JP | 2006170923 A | * | 6/2006 | ............. G01R 31/26 |
| JP | 2013-120836 A | | 6/2013 | |
| JP | 2017-118414 A | | 6/2017 | |
| JP | 2018-091804 A | | 6/2018 | |
| JP | 2019-095271 A | | 6/2019 | |
| WO | 2004/082114 A1 | | 9/2004 | |

OTHER PUBLICATIONS

Japanese Notice of Reasons for Refusal issued in corresponding Japanese Patent Application No. 2019-168868, dated Nov. 30, 2022, with English translation.

* cited by examiner

FIG. 4

| Application System | STB | OP | STB | OP | STB | OP |
|---|---|---|---|---|---|---|
| Motor Control | Stop | Drive | Stop | Drive | Stop | Drive |
| LED | OFF | ON | OFF | ON | OFF | ON |
| TPMS | Stop | Drive | Stop | Drive | Stop | Drive |
| Power Line | Stop | Transmit | Stop | Transmit | Stop | Transmit |

SEMICONDUCTOR DEVICE, ELECTRONIC DEVICE AND ELECTRONIC SYSTEM

CROSS-REFERENCE TO RELATED APPLICATIONS

The disclosure of Japanese Patent Application No. 2019-168868 filed on Sep. 17, 2019 including the specification, drawings and abstract is incorporated herein by reference in its entirety.

BACKGROUND

This disclosure relates to semiconductor devices, and is particularly applicable to semiconductor devices capable of communicating stress information.

In order to detect the deterioration of the semiconductor device, the present inventors have proposed a technique of a stress detecting circuit which converts the temperature of the semiconductor device into the deterioration stress intensity using a predetermined deterioration model (e.g., Arrhenius model) and performs predictive maintenance of the semiconductor device or the semiconductor system by the cumulative deterioration stress amount obtained by integrating the deterioration stress intensity.

There are techniques disclosed by the present inventors listed below.
[Patent Document 1] JP Unexamined Patent Application Publication No. 2017-118414
[Patent Document 2] JP Unexamined Patent Application Publication No. 2018-91804
[Patent Document 3] JP Unexamined Patent Application Publication No. 2019-95271

SUMMARY

IoTs (Internet of Things) have been studied to sense various states of devices, collect them via networks, and use them for predictive maintenance.

The present inventors have considered the form of a semiconductor device to be easily mounted on the same semiconductor chip as the stress detection circuit, or by mounting a wireless function in the same package as the semiconductor chip, mounted on an existing electronic system as a thermometer, the following new problems were found.

1) When a semiconductor device including a stress detection circuit is mounted on an electronic system to attempt to transmit the measured cumulative amount of deterioration stress (amount of heat stress) of the stress detection circuit by wireless communication, electromagnetic waves and heat generated during operation of the electronic system become noise, and wireless communication may be hindered.

2) In addition, in order to realize a configuration in which the stress detection circuit transmits the accumulated amount of deterioration stress wirelessly while the electronic system is stopped, it is necessary to allow the stress detection circuit to recognize that the electronic system is stopped.

In this case, it is also conceivable to receive standby stop information control system of the electronic system issues by the semiconductor device, the configuration for receiving standby stop information may increase the power consumption of the semiconductor device.

3) It may also be necessary for the control system of the existing electronic system to change the design involved in issuing the system stop information to the stress detection circuit.

It is an object of the present disclosure to provide a technique capable of wirelessly transmitting cumulative heat stress information while reducing power consumption.

Other problems and novel features will become apparent from the description herein and from the accompanying drawings.

A brief summary of representative of the present disclosure will be described below.

A semiconductor device according to an embodiment includes: a holding circuit including a buffer configured to obtain a heat stress information having a temperature dependency every predetermined period and a stress counter configured to accumulate the heat stress information and hold the accumulated value as a cumulative stress count value; a control circuit including an operation determination threshold value; and a wireless communication circuit. According to the semiconductor device according to the embodiment, while reducing the power consumption, it is possible to wirelessly transmit the cumulative heat stress information.

BRIEF DESCRIPTION OF THE DRAWINGS

FIG. 4 is a diagram illustrating an example of an applied electronic system of the semiconductor device of FIG. 1 or the electronic appliance of FIG. 2.

DETAILED DESCRIPTION

Figure 1:
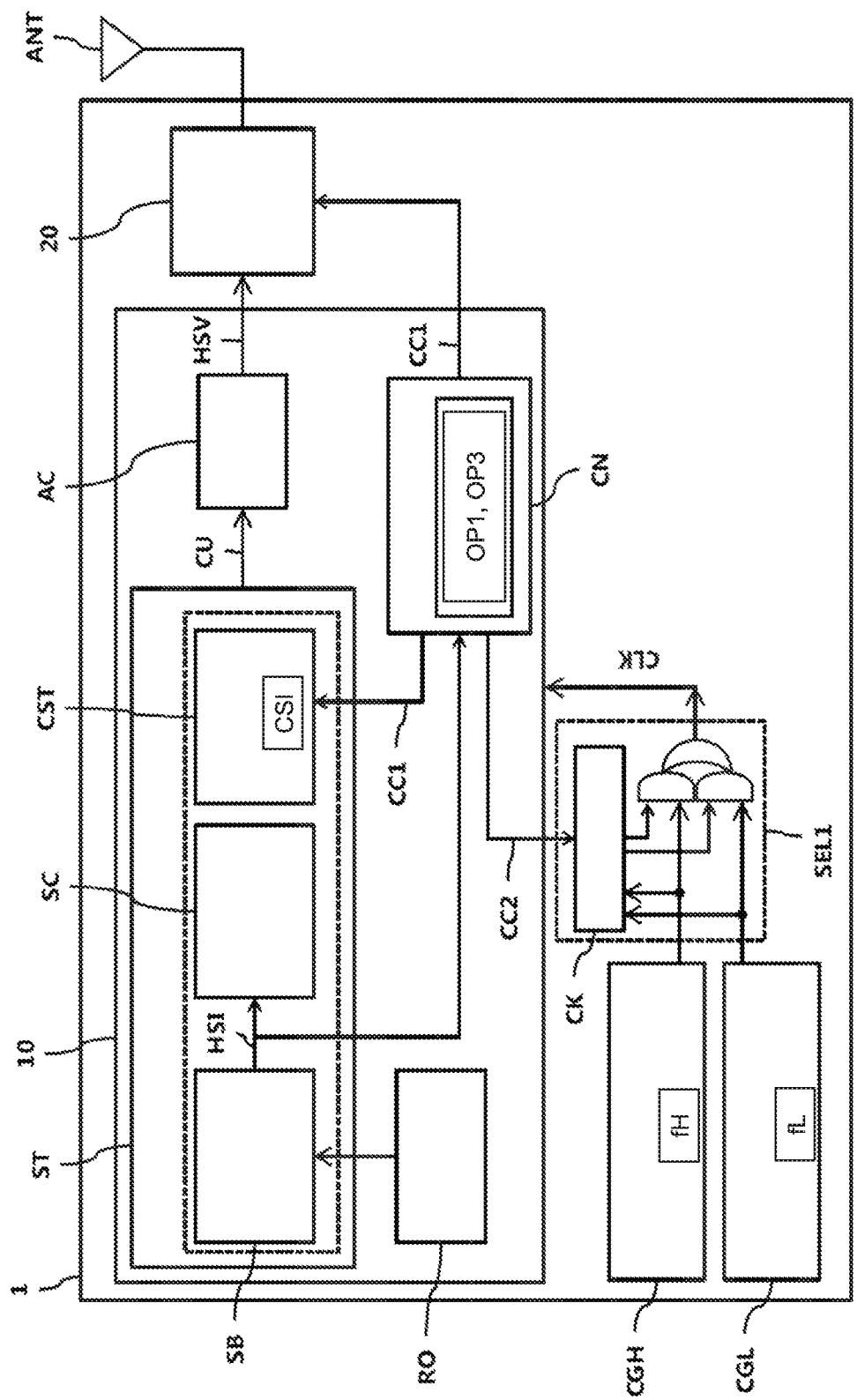
FIG. 1 is a diagram showing a configuration example of a semiconductor device according to the embodiment.

Semiconductor equipment leads to wear-out failure if it is used continuously for a long time.

Failure occurs at a predetermined probability when the product is continuously subjected to deterioration stress during the period of use and its cumulative amount reaches a certain value.

The life to failure depends on the power supply voltage and environmental temperature.

Instead of directly capturing the wear-out failure phenomenon, the inventors have studied to predict the wear failure based on the deterioration stress accumulated value of the power supply voltage and the environmental temperature received by the semiconductor device.

The present disclosure applies the above discussion, based on the deterioration stress accumulated value, is a technical concept of predicting not detecting the environmental temperature and the power supply voltage received by the semiconductor device.

In the present disclosure, a semiconductor device having a stress detection circuit is mounted to an existing electronic system to utilize a semiconductor device having a stress detection circuit, such as a thermometer.

That is, the temperature of the electronic system is detected based on the accumulated value of the deterioration stress.

Alternatively, when the semiconductor device having a stress detection circuit is supplied a power voltage from a small battery or an environmental power generation device, based on the deterioration stress accumulated value, to predict the life of the small battery and the output voltage of the environmental power generation device.

First, the relationship between the amount of stress and the life of the semiconductor device will be described.

A reference document is incorporated herein by reference. "Failure Mechanisms and Models for Semiconductor Devices" JEDEC publication No. 122E.

As described in the reference, for wear failure factors such as time-dependent dielectric breakdown (Time-Dependent Dielectric Breakdown, hereinafter referred to as gate-TDDB) and negative-bias temperature instabilities (Negative Bias Temperature Instability, hereinafter referred to as NBTI) of the gate oxides of the devices, the lifetime depends, for example, on the-n power of the voltage $V^{-n}$ (power-law model) or the reciprocal of the voltage $\exp(-BV)$) (V model), and at the same time, on the exponent of the reciprocal of the temperature ($\exp(Ea/kT)$).

In the wear failure factors of electromigration and stress migration, the lifetime depends on the exponent of the inverse of temperature ($\exp(Ea/kT)$), and the voltage dependence is small.

Where n, B and Ea are coefficients specific to wear-out failure factors and k is Boltzmann's constant.

The amount of stress can be expressed by the reciprocal of the life as shown in the following equations (1) and (2).

For gate-TDDB, NBTI:

$$1/\tau(T,V) \propto 1(V^{-n}\exp(Ea/kT)) = V^n \exp(-Ea/kT) \quad (1)$$

Where $\tau(T,V)$ is a function of temperature (T), voltage (V) and is the wear-out fault life depending on T and V.

For electromigration and stress migration:

$$1/\tau(T) \propto 1(V^{-n}\exp(Ea/kT)) = \exp(-Ea/kT) \quad (2)$$

Where $\tau(T)$ is a function of temperature (T) and is a temperature-dependent wear failure life.

Embodiments will be described below with reference to the drawings.

However, in the following description, the same components are denoted by the same reference numerals, and a repetitive description thereof may be omitted.

It should be noted that the drawings may be represented schematically in comparison with actual embodiments for the sake of clarity of explanation, but are merely an example and do not limit the interpretation of the present invention.

Example of Configuration of a Semiconductor Device

FIG. 1 is a diagram showing a configuration example of a semiconductor device according to the embodiment.

Semiconductor device 1, for example, a semiconductor substrate such as single crystal silicon (also referred to as a semiconductor chip), a semiconductor integrated circuit device formed using a known method of manufacturing a CMOS transistor.

Semiconductor device 1, like a thermometer, is mounted to an electronic appliance or device constituting the electronic system, it is utilized to measure the temperature of the electronic appliance or device to be measured temperature.

The semiconductor device 1 includes a stress detection circuit 10, a wireless communication circuit 20, a first clock generating circuit CGH, a second clock generating circuit CGL, and a clock selection circuit SEL1.

The wireless communication circuit 20, the antenna ANT is connected.

Semiconductor device 1 is provided inside one semiconductor package.

Semiconductor device 1 need not be formed of one semiconductor chip.

The stress detection circuit 10 and the first clock generating circuit CGH and the second clock generating circuit CGL and the clock selection circuit SEL1 are preferably formed of one semiconductor chip.

Wireless communication circuit 20, the stress detection circuit 10 and the first clock generating circuit CGH and the second clock generating circuit CGL and the clock selection circuit SEL1 is formed one semiconductor chip (first semiconductor chip) may be formed in another one semiconductor chip (second semiconductor chip).

In this case, the inside of one semiconductor package, a first semiconductor chip and the second semiconductor chip is provided.

Stress detecting circuit 10 converts the temperature of the electronic appliance or device to which the semiconductor device 1 is attached to the deterioration stress intensity using a predetermined deterioration model (e.g., a Arrhenius model), and calculates the cumulative deterioration stress amount or the like obtained by integrating the deterioration stress intensity.

The stress detection circuit 10 includes a ring oscillator RO, a circuit (cumulative deterioration stress amount holding circuit) ST for holding the cumulative deterioration stress amount, an arithmetic circuit AC, and a control circuit CN.

The ring oscillator RO has a temperature dependence of its oscillation frequency.

The oscillation frequency of the ring oscillator RO is strongly correlated with the amount of deterioration stress.

In this sense, the oscillation frequency of the ring oscillator RO can be regarded as heat stress information HSI.

Cumulative deterioration stress amount holding circuit ST includes a synchronization buffer (first synchronization buffer) SB and the cumulative stress counter SC.

The synchronization buffer SB acquires and temporarily holds the oscillation frequency (heat stress information HSI) of the ring oscillator RO for each unit count operation period.

The unit count operation period is a count sampling period of a constant period in which the temperature can be regarded as nearly constant.

The cumulative stress counter SC continuously adds (accumulates) the oscillation frequency (heat stress information HSI) of the ring oscillator RO output from the synchronization buffer SB and holds the result as a cumulative stress count value CU.

Cumulative deterioration stress amount holding circuit ST also includes a circuit for holding the switching count information CSI (switching count information holding circuit) CST.

The switching count information CSI will be described later.

The arithmetic circuit AC performs an arithmetic operation for calculating the heat stress amount HSV from the cumulative stress count value CU held by the cumulative stress counter SC.

The heat stress amount HSV can also be referred to as cumulative heat stress information.

The arithmetic circuit AC may be configured by a hardware circuit, or may be configured by software in which a central processing unit CPU provided in the semiconductor device 1 is executed.

The controller CN holds a plurality of operation determination thresholds OP1, OP3.

The plurality of operation determination threshold OP1, OP3 is utilized as a determination threshold value for determining the operation status of the electronic appliance or the device to which the semiconductor device 1 is attached.

The controller CN compares the heat stress information HSI from the synchronization buffer SB with a plurality of operation determination thresholds OP1, OP3.

The control circuit CN generates the first control signal CC1 and the second control signal CC2 based on the comparison result between the heat stress information HSI from the synchronization buffer SB and the first operation determination threshold OP1.

The first control signal CC1, the wireless communication circuit 20, is output to the switching count information holding circuit CST, the second control signal CC2 is output to the clock selection circuit SEL1.

The control circuit CN outputs a control signal CC1 such that the heat stress information HSI temporarily becomes an activation level as a trigger when the heat stress information HSI transitions from a first state larger than the first operation determination threshold OP1 to a second state smaller than the first operation determination threshold OP1.

The control circuit CN also outputs a second control signal CC2 which is the active level when the heat stress information HSI is in the first state greater than the first operation determination threshold OP1.

On the other hand, the control circuit CN, when the heat stress information HSI is in the second state smaller than the first operation determination threshold OP1, and outputs a second control signal CC2 to be inactive level.

The third operation determination threshold OP3 will be described later.

The transition of the heat stress information HSI from the first state greater than the first operation determination threshold OP1 to the second state smaller than the first operation determination threshold OP1 indicates that the temperature of the electronic appliance or the device to which the semiconductor device 1 is attached has decreased.

This is considered to indicate that the electronic appliance or device to which the semiconductor device 1 is attached has shifted from the operating state to the non-operating state that does not stop.

Radio communication circuit 20, based on the activation level of the first control signal CC1, wirelessly transmits the heat stress amount HSV from the antenna ANT.

The first control signal CC1 is utilized as a transmission trigger signal of the wireless communication circuitry 20.

Switching count information holding circuit CST, based on the activation level of the control signal CC1, to increase the switching count by one, updating the switching count information CSI.

The switching count information CSI indicates the number of times the heat stress information HSI has transitioned from the first state in which the heat stress information HSI is larger than the first operation determination threshold OP1 to the second state in which the heat stress information HSI is smaller than the first operation determination threshold OP1.

The first clock generating circuit CGH generates a first operation clock signal of the high-speed frequency (first frequency) fH for normal operation of the semiconductor device 1 (first clock signal).

On the other hand, the second clock generating circuit CGL, as compared with the high-speed frequency fH, generates a second operation clock signal of the low-speed frequency (second frequency) fL (second clock signal).

The frequency fL is, in one example, a frequency such as (fH/1000).

Clock selection circuit SEL1, based on the input of the second control signal CC2 to the switching circuit CK, the first operation clock signal of the high-speed frequency fH generated by the first clock generating circuit CGH and the second operation clock signal of the low-speed frequency fL generated by the clock generating circuit CGL switching, and outputs the operation clock CLK of the stress detection circuit 10.

When the heat stress information HSI is equal to or greater than the first operation determination threshold OP1, the first operation clock signal of the high-speed frequency fH generated by the first clock generating circuit CGH is given as the operation clock CLK of the stress detection circuit 10.

When the heat stress information HSI is equal to or less than the first operation determination threshold OP1, the second operation clock signal of the slow frequency fL generated by the second clock generating circuit CGL is given as the operation clock CLK of the stress detection circuit 10.

That is, the clock selection circuit SEL1, based on the activation level of the second control signal CC2, to select the first operation clock signal of the high-speed frequency fH as the operation clock CLK.

On the other hand, the clock selection circuit SEL1, based on the deactivation level of the second control signal CC2, selects the second operation clock signal of the slow frequency fL as the operation clock CLK.

The oscillation frequency of the ring oscillator RO will be described.

As the temperature influence on the deterioration stress, it is known that, in addition to the deterioration factor according to Arrhenius model, there is also a deterioration factor influenced by the temperature rise and fall.

According to the reference, the deterioration stress intensity is expressed as shown in Equations 3 and 4.

Deterioration stress strength (=reciprocal of lifetime ($\tau(T)$)) of deterioration factors according to Arrhenius model:

$$\text{Deterioration Stress Strength} \propto \exp(-Ea/kT) \quad (3)$$

Deterioration stress intensity of deterioration factors influenced by temperature rise and fall:

$$\text{Deterioration Stress Strength} \propto \Delta T^n f^m \times \exp(-Ea/kT) \quad (4)$$

Where n, m is the coefficient specific to the wear-out failure factor, $\Delta T$ is the temperature rise and fall width, f is the temperature rise and fall frequency, Ea is the activation energy (temperature dependence coefficient), k is the Boltzmann constant, and T is the absolute temperature (K).

The switching count information CSI is information related to f in Equation 4.

Therefore, it is possible to calculate the deterioration stress intensity in consideration of the switching count information CSI.

The oscillation frequency of the ring oscillator RO can be expressed as a function of temperature (T).

Assuming that the oscillation frequency of the ring oscillator RO is F(T), F(T) is proportional to the exponent exp(−Ea/kT) of the temperature inverse.

Therefore, F(T) satisfies the following relationship (Equation 5) and greatly depends on T.

$$F(T) \propto \exp(-Ea/kT) \quad (5)$$

The ring oscillator RO has the characteristic of Equation 5.

That is, by detecting the oscillation frequency of the ring oscillator RO, the temperature (T) can be measured.

The timing at which the heat stress information HSI being measured by the stress detection circuit 10 has fallen to a predetermined level (first operation determination threshold OP1) is considered to be the timing at which the electronic system to be measured (electronic appliance or device) has stopped operating.

At the timing when the electronic system to be measured (electronic equipment and devices) stops operating, electromagnetic waves and heat generated by the electronic system to be measured are considered to be relatively low.

Therefore, the semiconductor device 1, without being obstructed by electromagnetic waves and heat electronic system to be measured is generated, the heat stress amount HSV is a measurement result, based on the first control signal CC1, the semiconductor device 1 from the wireless communication circuit it can be stably wirelessly transmitted to the outside.

Further, since it is not necessary to receive standby stop information control system of the electronic system issues by the semiconductor device 1, it is possible to reduce the power consumption of the semiconductor device 1.

Alternatively, with respect to the control system of the existing electronic system, there is no need to perform design changes related to issuance of the system stop information to the stress detection circuit 10, it is easy to implement the electronic system to be measured of the semiconductor device 1.

Judging from the level of the heat stress information HSI, at a timing at which the electronic system is considered to have stopped, since switching the operation clock CLK of the stress detection circuit 10 from a high-speed frequency fH to a low-speed frequency fL, until the detection of the next operation start, the stress detection circuit 10 is in a low power consumption state.

Configuration Examples of Electronic Systems and Electronic Appliances

Figure 2:
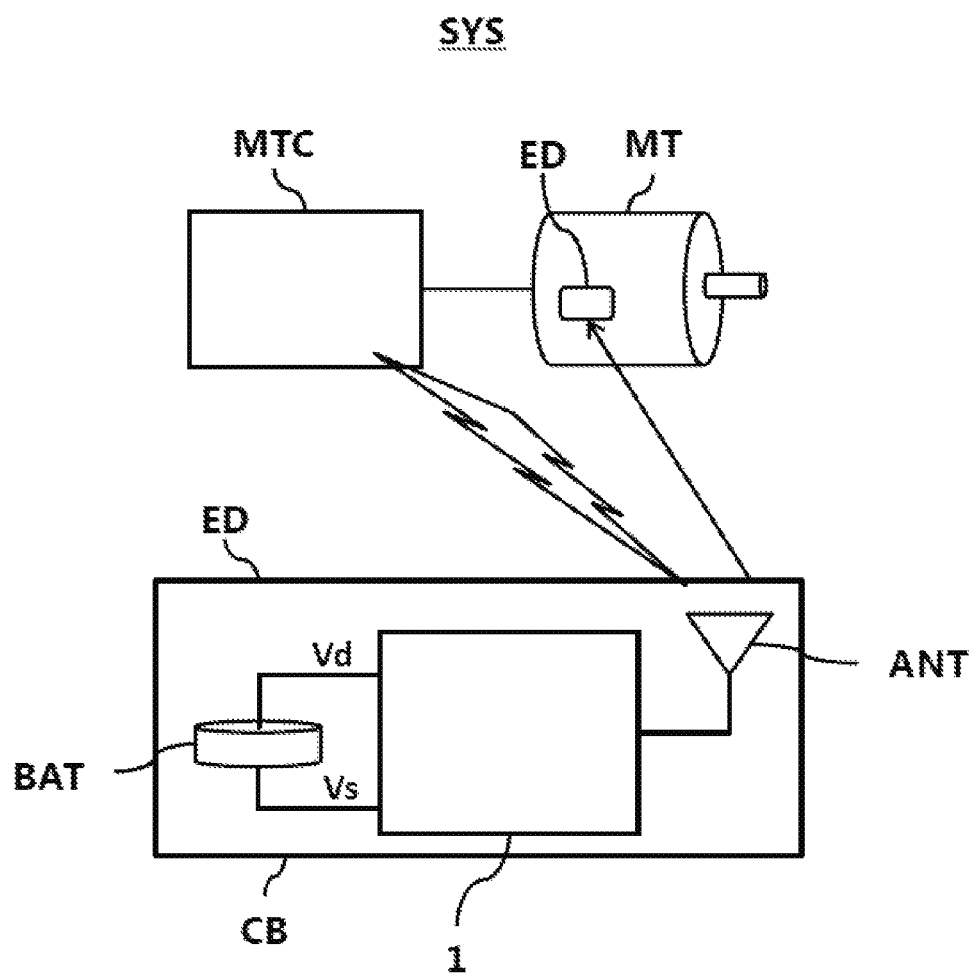
FIG. 2 is a diagram illustrating a configuration example of an electronic apparatus and an electronic system according to an embodiment.

FIG. 2 is a diagram illustrating a configuration example of the electronic system according to the embodiment.

As shown in FIG. 2, the electronic appliance ED includes a semiconductor device 1 provided with an antenna ANT, a small battery BAT for supplying a power supply potential Vd and the ground potential Vs to the semiconductor device 1, the semiconductor device 1 and the battery BAT is mounted It is constituted by a circuit board CB.

The battery BAT may, in one example, utilize a coin battery, a button battery, or the like.

Electronic appliance ED is attached to an electronic appliance or device to be measured temperature.

In FIG. 2, exemplary, as an electronic system SYS, shows a motor control system, the motor control system includes a motor MT and the motor control circuit MTC.

Corresponds to electronic equipment and equipment whose motor MT is the measurement object of temperature.

On the surface of the outer wall of the motor MT, an electronic appliance ED is attached.

Motor control circuit MTC controls the rotation operation of the motor MT, the control of the rotation stop of the motor MT, performs control operations such as control of the rotational speed of the motor MT.

Motor control circuit MTC receives the heat stress amount HSV transmitted wirelessly from the antenna ANT of the electronic appliance ED, it is possible to control the operation of the motor MT.

Receiving side of the heat stress amount HSV transmitted wirelessly from the antenna ANT is not limited to the motor control circuit MTC.

The receiving side of the heat stress amount HSV may be another network device (not shown).

Semiconductor device 1, as described in FIG. 1, in the period in which the electronic system SYS is considered to have stopped, since the operation clock CLK of the stress detection circuit 10 is a low-speed frequency fL, the power consumption of the semiconductor device 1 is reduced.

Therefore, it is possible to lengthen the life or use time of a small battery BAT for supplying power to the semiconductor device 1.

Therefore, it is possible to reduce the replacement frequency of the small battery BAT.

The wireless transmission of the measurement result can also be stably performed as described in FIG. 1.

Furthermore, the existing electronic system has the effect that the electronic appliance ED can be easily added on like a thermometer.

The supply of power to the semiconductor device 1 is not limited to a small battery BAT.

Instead of a small battery BAT, an environmental power generation device that generates a voltage by light or vibration may be used as a power source for the semiconductor device 1.

(Explanation of Heat Stress Information HSI, First Operation Determination Threshold OP1, Third Operation Determination Threshold OP3)

Figure 3:
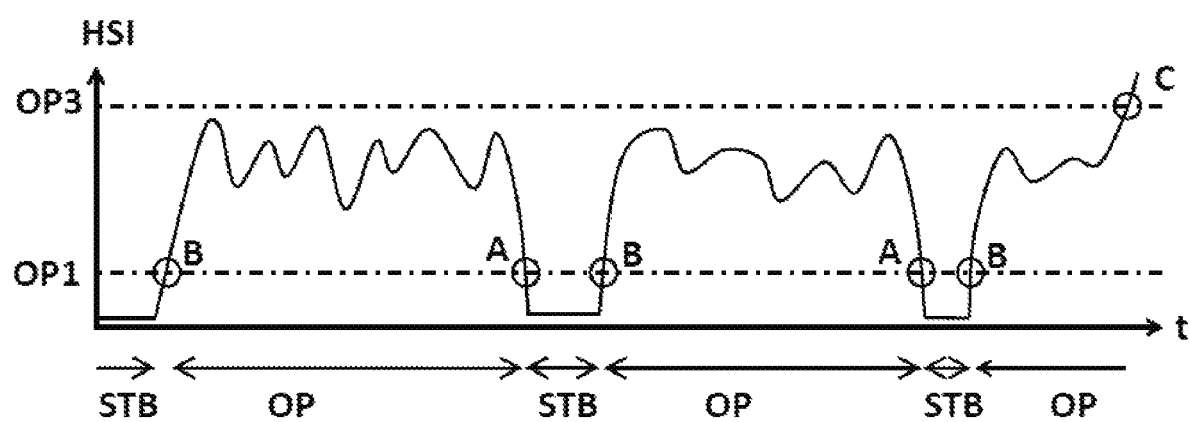
FIG. 3 is a diagram schematically showing the time course of the heat stress information of the electronic system.

FIG. 3 is a diagram schematically showing the time course of the heat stress information of the electronic system.

The vertical axis represents the heat stress information HSI, and the horizontal axis represents the time t.

The electronic system SYS shall repeat the operation state OP and the states other than the operation state OP.

In FIG. 3, states other than the operation state OP are shown as a standby state STB.

In the operating state OP, the heat stress information HSI is large, and in the standby state STB, the heat stress information HSI is small compared to the heat stress information HSI in the operating state OP.

Control circuit CN of the semiconductor device 1 generates a control signal CC1, CC2 or the like by detecting the transitional point of the heat stress information HSI indicated by the points A, B, C.

Points A are times at which the heat stress information HSI transitions from the first state in which the value of the heat stress information HSI is larger than the first operation determination threshold value OP1 to the second state in which the value of the heat stress information HSI is smaller than the first operation determination threshold value OP1.

The control signal CC1 triggers the radio transmission of the heat stress level HSV and further triggers the updating of the switching count CSI.

The control signal CC2 induces switching of the clock of the operating clock CLK of the stress detection 10 from a fast frequency fH to a slow frequency fL.

Points B are times at which the heat stress information HSI transitions from the second state in which the value of the heat stress information HSI is smaller than the first operation determination threshold OP1 to the first state in which the value of the heat stress information HSI is larger than the first operation determination threshold OP1.

The control signal CC2 induces switching of the operating clock CLK of the stress detection 10 from a slow frequency fL to a fast frequency fH.

Points C are timings at which the value of the heat stress information HSI exceeds the third operation determination threshold value OP3.

The third operation determination threshold value OP3 is used as an anomaly heat stress determination threshold value for determining that the value of the heat stress information HSI has become anomaly.

Since the point C indicates an anomaly of the electronic system SYS, the heat stress amount HSV may be wirelessly transmitted by the wireless communication circuit 20.

Alternatively, the anomaly occurrence information of the electronic system SYS may be wirelessly transmitted by the wireless communication circuit 20.

As a result, a person who performs operation management and maintenance of the electronic system SYS can perform maintenance such as stoppage of operation of the electronic system SYS and replacement of components and devices of the electronic system SYS based on the heat stress amount HSV and the anomaly occurrence information.

Therefore, the first state in which the value of the heat stress information HSI is larger than the first operation determination threshold value OP1 can be regarded as the duration of the operation state OP of the electronic system.

On the other hand, the second state in which the value of the heat stress information HSI is smaller than the first operation determination threshold value OP1 can be regarded as the duration of the standby state STB of the electronic system.

Examples of Applicable Electronic Systems

FIG. 4 is a diagram illustrating an example of an applied electronic system of the semiconductor device of FIG. 1 or the electronic appliance of FIG. 2.

FIG. 4 shows a correspondence relationship between each electronic system and the operating state OP of each electronic system and a state other than the operating state OP, i.e., the standby state STB.

Applicable systems include, in addition to the motor control system shown in FIG. 2, LED systems, TPMS systems, power line systems, and the like.

The motor control system controls the rotation stop and rotation operation of the motor.

The motor rotation stop corresponds to the standby state STB, and the motor rotation corresponds to the operation state OP.

When the motor rotates, the temperature of the motor increases.

When the motor stops rotating, the temperature of the motor becomes low.

An electronic appliance ED is mounted on the outer wall of the motor, and the temperature of the motor is measured.

The LED system controls turning off and lighting of LED lighting using light emitting diode (LED).

The LED illumination turning off corresponds to the standby state STB, and the LED illumination turning on corresponds to the operating state OP.

When the LED illumination is turned on, the temperature of the light emitting diode becomes high.

When the LED illumination turns off, the temperature of the light emitting diode becomes low.

Mounting the conductor device 1 or the electronic appliance ED to the circuit board on which the light emitting diode is mounted, to measure the temperature of the circuit board on which the light emitting diode is mounted.

TPMS (Tire Pressure Detection System: Tire Pressure Monitoring System) is a system that detects the pressure of a tire in a car.

The stopping state of automobiles corresponds to the standby state STB, and the running state of automobiles corresponds to the operating state OP.

When an automobile runs, the temperature of the gas such as air or nitrogen filled in the tire increases.

When the vehicle stops, the temperature of the gas filled in the tire decreases.

A semiconductor device 1 or an electronic appliance ED is mounted on a pressure detecting device mounted on a valve of a tire, and the temperature of the gas filled in the tire is measured.

Power line systems transmit power from power plants to power lines in renewable energy (renewable energy), such as wind and solar power.

The stopping state of power transmission to the power line corresponds to the standby state STB, and the transmitting state of power to the power line corresponds to the operating state OP.

When power is transmitted to the power line, the temperature of the power line becomes high.

When the transmission of power to the power line is stopped, the temperature of the power line becomes low.

An electron device ED is attached to the power line, and the temperature of the power line is measured.

Power line, in one example, the conductive wire such as copper wire is configured to be coated by an insulating cover made of an insulating material, when the temperature of the conductive wire is higher than expected, the insulating cover is also conceivable as burnt.

In order to prevent such a situation that the insulating cover is burnt, it is preferable to measure the temperature of the power line.

(Variation of the First Operation Determination Threshold)

Figure 5:
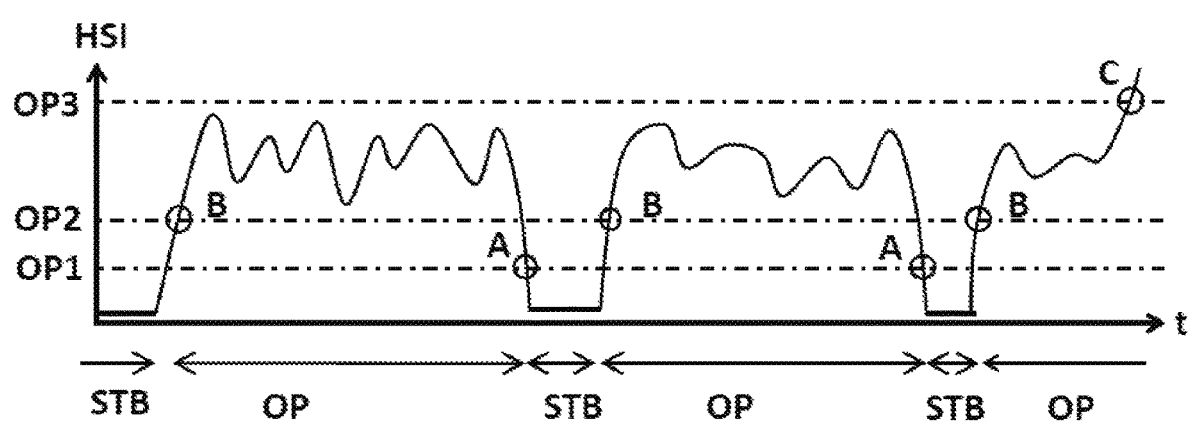
FIG. 5 is a diagram illustrating a modification of the operation determination threshold value.

FIG. 5 is a diagram illustrating a modification of the first operation determination threshold value.

In FIG. 5, the axis represents the heat stress information HSI, the horizontal axis represents the time t.

In FIG. 3, the point A and the point B are detected by the first operation determination threshold value OP1.

In FIG. 5, a second operation determination threshold value OP2 is newly provided in addition to the first operation determination threshold value OP1.

In one embodiment, the second operation determination threshold OP2 is greater than the first operation determination threshold OP1.

Accordingly, the control circuit CN is configured to hold the three operation determination thresholds of the first operation determination threshold OP1, the second operation determination threshold OP2, and the third operation determination threshold OP3.

The three operation determination threshold values of the first operation determination threshold value OP1, the second operation determination threshold value OP2, and the third operation determination threshold value OP3 are utilized as the operation determination threshold values for the electronic system (electronic equipment or device) to be measured to determine the operation state.

The first operation determination threshold value OP1 is used to detect the point A in the same manner as in FIG. 3.

That is, the first operation determination threshold value OP1 is used when the value of the heat stress information HSI falls from a state in which the heat stress information HSI is larger than the first operation determination threshold value OP1 to a state in which the heat stress information HSI is smaller than the first operation determination threshold value OP1.

On the other hand, the second operation determination threshold value OP2 is used to detect the point B.

That is, the second operation determination threshold value OP2 is used when the value of the heat stress information HSI rises from a state in which the heat stress information HSI is smaller than the second operation determination threshold value OP2 to a state in which the heat stress information HSI is larger than the second operation determination threshold value OP2.

By giving the hysteresis to the operation determination threshold as in the first operation determination threshold OP1 and the second operation determination threshold OP2, it is possible to solve the problem of repeating or misjudging the determination of points A and B in a short period of time due to the effects of fluctuations or noises.

In addition to the method of providing the first operation determination threshold OP1 and the second operation determination threshold OP2, such as performing the final determination after confirming that the heat stress information HSI by the unit-counting operation of a plurality of times is continuously lowered or raised, the effect of fluctuations and noise it is preferable to adopt a determination method that can eliminate.

Example of Setting the Operation Determination Threshold

Next, some examples of setting the operation determination threshold value will be described.

Example 1 of Setting the Operation Judgment Threshold Value

Figure 6:
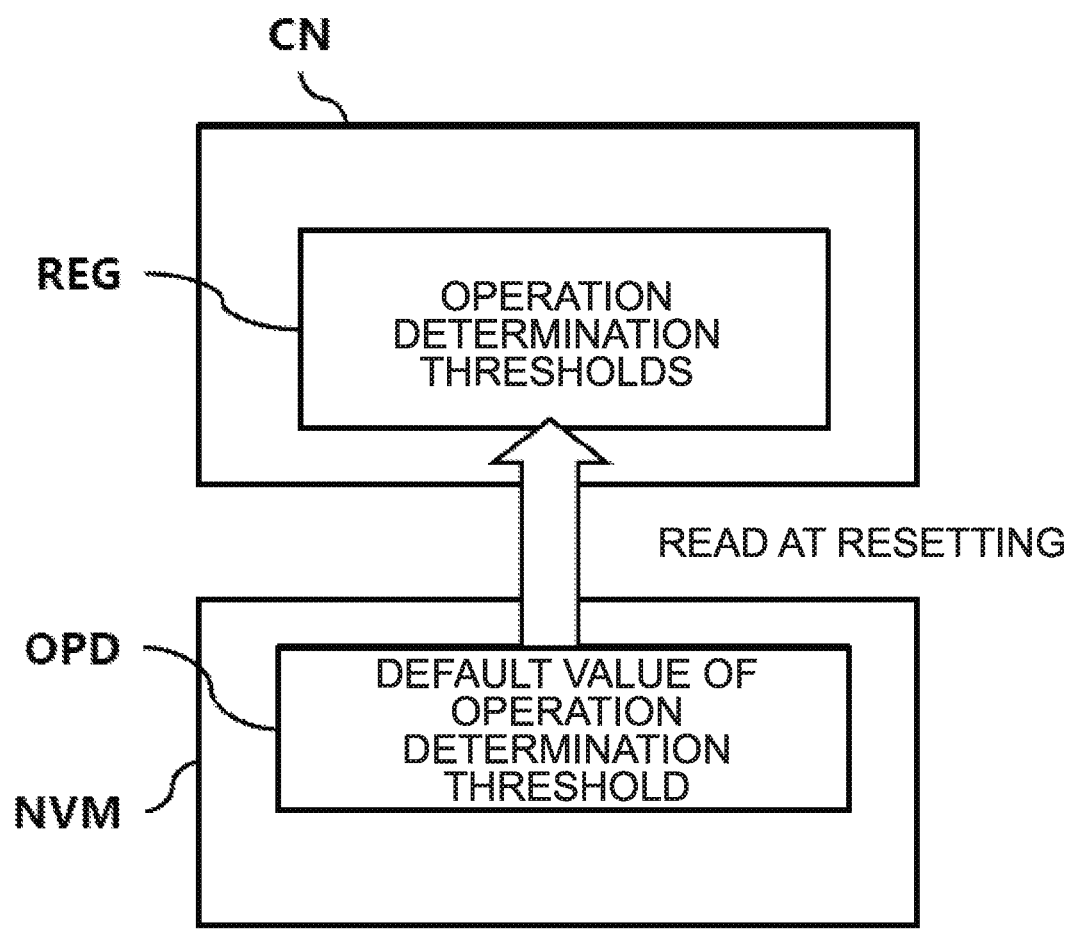
FIG. 6 is a diagram illustrating a first example of setting an operation determination threshold value.

FIG. 6 is a diagram illustrating a first example of setting an operation determination threshold value.

As shown in FIG. 6, the control circuit CN includes a register REG for holding a plurality of operation determination thresholds OP1, OP2 and OP3.

A non-volatile memory NVM such as a flash memory is provided in the solid state device 1 of FIG. 1, and the non-volatile memory NVM stores a default value OPD of a plurality of operation determination thresholds (OP1, OP2 and OP3).

The default value OPD is configured to be read into the register REG in response to power supplied to the semiconductor device 1 from, for example, a battery or the like and power-on reset of the semiconductor device 1.

In the default value OPD, the default value of the first operation determination threshold value OP1 may be, in one example, a value of the heat stress information HSI corresponding to a temperature (e.g. 50° C.) appropriate for distinguishing the operating state OP and the standby state STB of the electronic system SYS to which the semiconductor device 1 is attached.

The default value of the second operation determination threshold value OP2 may be a value slightly higher than the default value of the first operation determination threshold value OP1, for example, a value of the heat stress information HSI corresponding to 55° C.

The default value of the third operation determination threshold value OP3 is set to a value of the heat stress information HSI to the extent that the heat stress information HSI can determine a failure or an anomaly of the corresponding electronic system SYS.

The default value of the third operation determination threshold OP3 may be set based on the corresponding electronic system SYS.

Example 2 of Setting the Action Judgment Threshold Value

Figure 7:
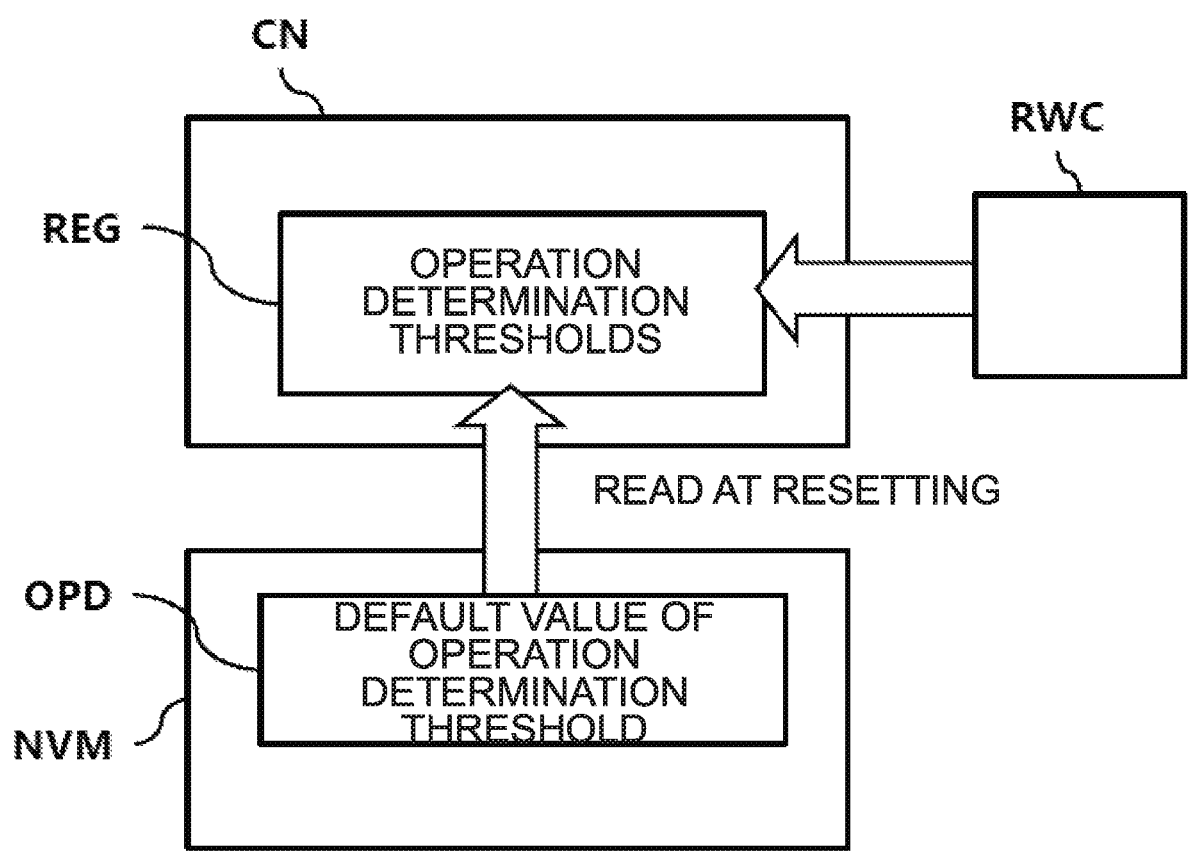
FIG. 7 is a diagram illustrating a second example of setting the operation determination threshold value.

FIG. 7 is a diagram illustrating a second example of setting the operation determination threshold value.

FIG. 7 differs from FIG. 6 in that a rewriting circuit RWC for rewriting the contents of the register REG is provided in FIG. 7.

Other configurations and operations are the same as in FIG. 6, so redundant description will be omitted.

An administrator or a user of the electronic system SYS can set an operation determination threshold value optimal for the usage environment of the electronic system SYS in the register REG by using the rewriting circuit RWC.

That is, when the power-on reset is performed, the defaults OPD of the plurality of operation determination thresholds OP1,OP2,OP3 stored in the register REG can be changed to the operation determination thresholds optimal for the use environments of the electronic systems SYS by using the rewrite circuits RWCs.

This makes it possible to more accurately determine the operation of the electronic system SYS.

Example 3 of Setting the Operation Judgment Threshold Value

Figure 8:
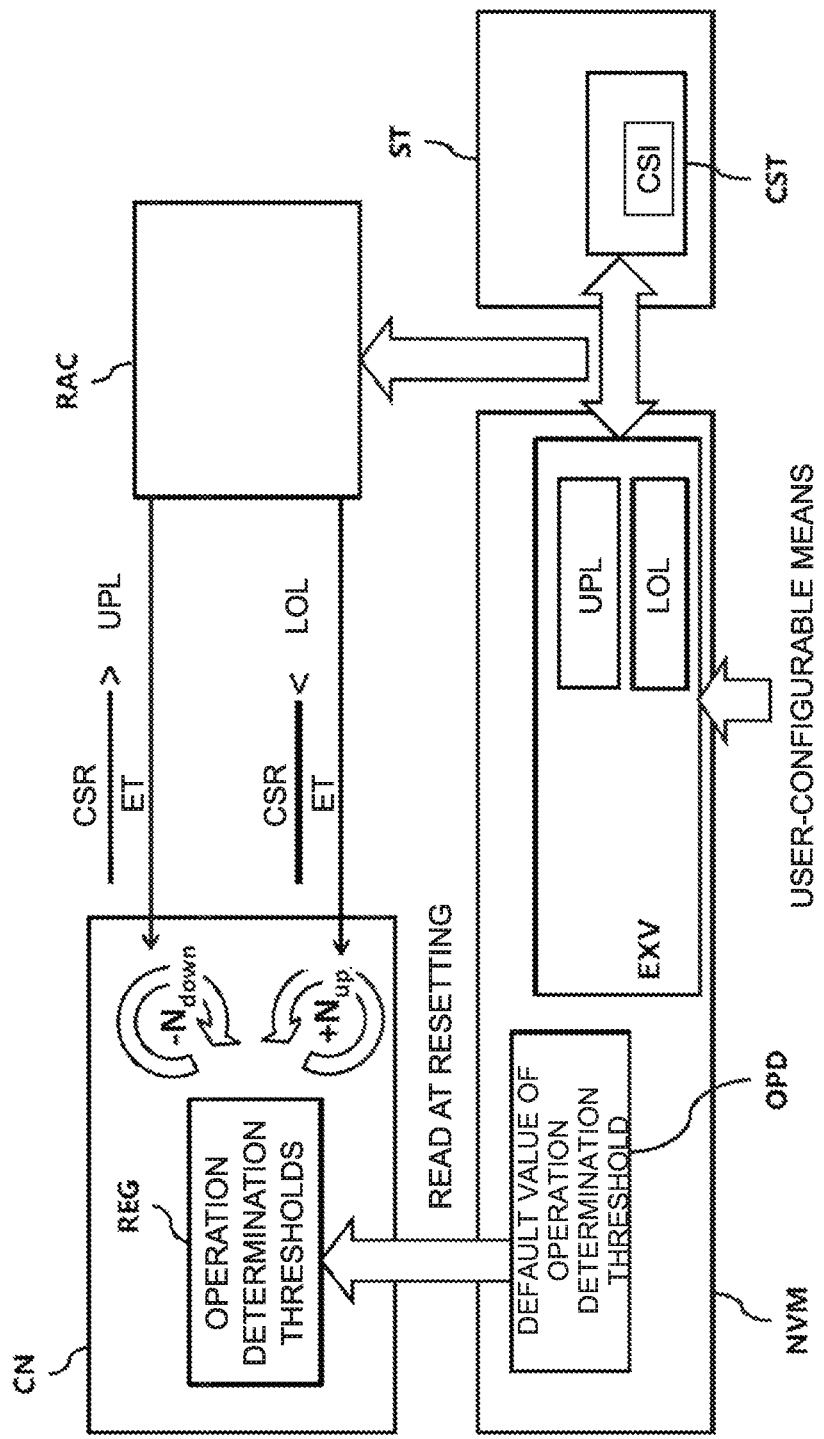
FIG. 8 is a diagram illustrating a third example of setting the operation determination threshold value.

FIG. 8 is a diagram illustrating a third example of setting the operation determination threshold value.

In FIG. 8, the operation determination threshold value stored in the register REG is automatically adjusted or updated to the optimum operation determination threshold value based on the past heat stress history.

The user sets the upper limit value UPL and the lower limit value LOL of the expected value EXV of the switching count per elapsed time to the nonvolatile memory NVM.

The register value automatic correction circuit RAC automatically adjusts, for example, the operation determination threshold OP1 during use of the semiconductor device 1.

That is, when the actual switching count CSR per elapsed time ET exceeds the upper limit value UPL of the expected switching count EXV ((CSR/ET)>UPL)), the register value auto-correction circuit RAC lowers the value of the operation determination threshold value OP1 stored in the register REG by a predetermined value N (−Ndown).

When the actual switching count CSR per elapsed time ET is lower than the lower limit value LOL of the expected value EXV ((CSR/ET)<LOL)), the register value auto-correction circuit RAC raises the value of the operation determination threshold value OP1 stored in the register REG by a predetermined value N (+Nup).

The switching count is a frequency at which the operation state OP is changed to the standby state STB, and the register value automatic correction circuit RAC is started every time the switching count is updated.

As a result, the value of the first operation determination threshold value OP1 stored in the register REG of the control circuit CN can be automatically adjusted to the optimum operation determination threshold value based on the previous heat stress history, so that the operation determination of the electronic system SYS can be performed more accurately.

Configuration Example of the Stress Detection Circuit 10

Figure 9:
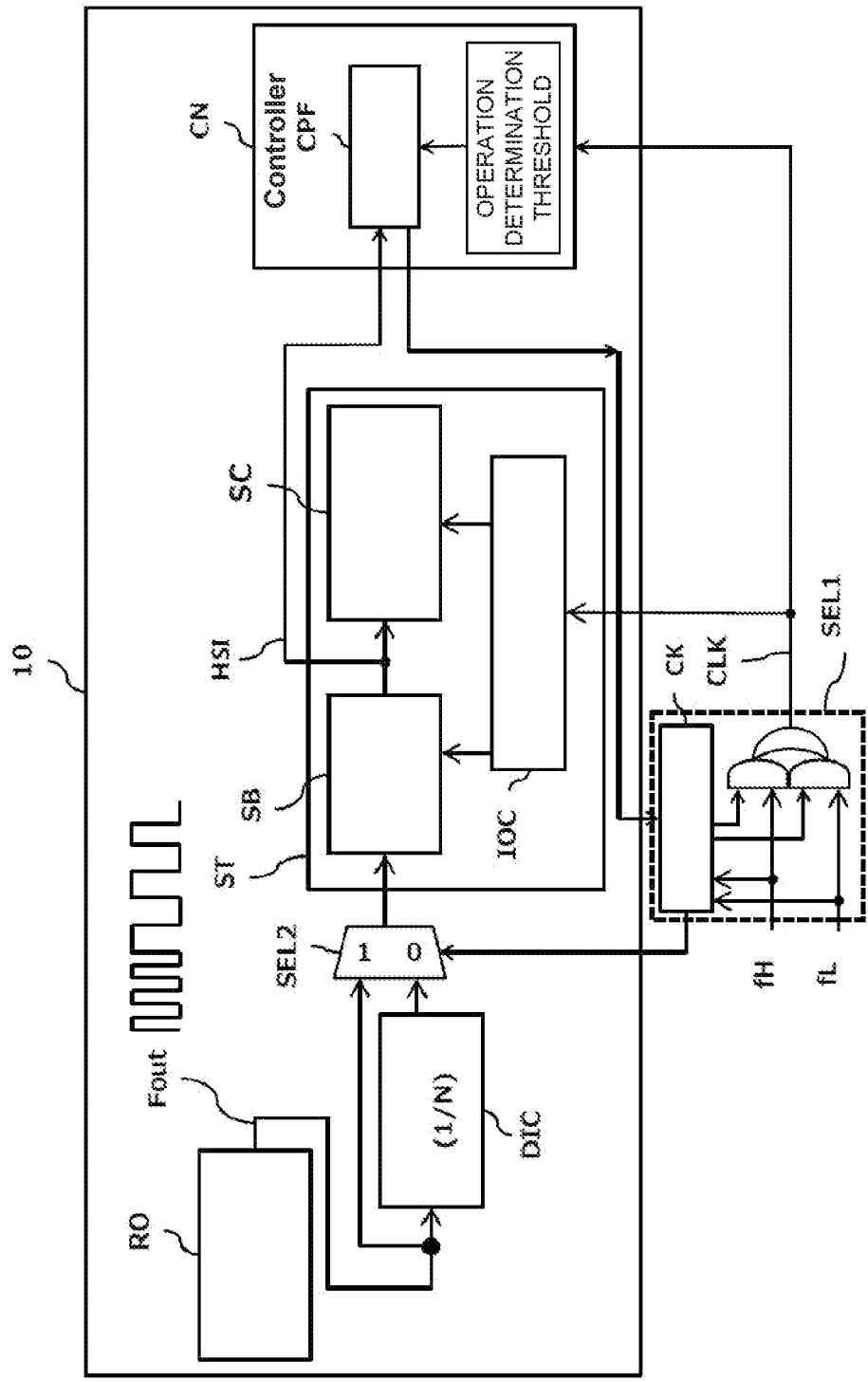
FIG. 9 is a diagram illustrating a configuration example of a main part of the stress detection circuit of FIG. 1.

FIG. 9 is a diagram illustrating a configuration example of a main part of the stress detection circuit of FIG. 1.

FIG. 9 shows a configuration example of switching the operation clock CLK of the stress detection circuit 10.

In FIG. 9, the switching count information holding circuit CST shown in FIG. 1, the description of the arithmetic circuit AC is omitted.

Parts different from the stress detection circuit 10 of FIG. 1 will be mainly described.

As shown in FIG. 9, the stress detecting circuit 10 further includes a frequency divider circuit DIC, a selection circuit SEL2.

Further, the cumulative deterioration stress amount holding circuit ST further includes an intermittent operation control circuit IOC, the control circuit CN further includes a comparison circuit CPF.

The frequency divider DIC divides the oscillator output Fout of the ring oscillator RO by 1/N.

The selection circuit SEL2 selects either the oscillation output Fout of the ring oscillator RO or the output of the frequency divider circuit DIC and inputs it to the synchronization buffer SB.

Selection circuit SEL2, its selection operation is controlled by the output of the switching circuit CK in the clock selection circuit SEL1.

When the clock selection circuit SEL1 selects the first operation clock signal having a high-speed frequency fH as the operation clock CLK, the output of the switching circuit CK becomes 1, the selection circuit SEL2 selects the oscillation output Fout of the ring oscillator RO and inputs it to the synchronization buffer SB.

On the other hand, when the clock selection circuit SEL1 selects the second operation clock signal of the low-speed frequency fL as the operation clock CLK, the output of the switching circuit CK becomes 0, the selection circuit SEL2 selects the output of the frequency divider circuit DIC, and inputs to the synchronization buffer SB.

The intermittent operation control circuit IOC receives the operation clock CLK to control the intermittent operation of the synchronization buffer SB and the cumulative stress counter SC.

Comparison circuit CPF, considering the frequency of the operation clock CLK, performs a comparison operation between the heat stress information HSI and the operation determination threshold.

The stress detection circuit 10 accumulates the oscillation output Fout of the ring oscillator RO in the cumulative stress counter SC as described above.

The oscillation frequency of the ring oscillator RO is strongly correlated with the amount of deterioration stress.

In other words, the oscillation frequency of the ring oscillator RO is related to (the oscillation frequency of the ring oscillator RO $\propto$ the amount of deterioration stress (heat stress)$\propto \exp(-Ea/kT)$).

In order for the synchronization buffer shown in FIG. 9 to correctly capture the asynchronous oscillation of the ring oscillator RO, the frequency of the operating clock CLK of the stress detection circuit 10 must be faster than the frequency of the asynchronous oscillation of the ring oscillator RO.

If the frequency of the operating clock CLK is slower than the frequency of the asynchronous oscillation of the ring oscillator RO, part of the asynchronous oscillation of the ring oscillator RO is missed, resulting in fewer cumulative stress counter SC acquisition counts than actual.

On the other hand, the oscillation frequency of the ring oscillator RO decreases logarithmically as the temperature decreases.

In the stress detecting circuit 10, while correctly capturing the asynchronous oscillation of the ring oscillator RO, when the electronic system SYS is stopped (standby state STB), the frequency of the operation clock CLK (low-speed frequency fL) can be logarithmically slower than the frequency of the operation clock CLK during operation of the electronic system SYS (high-speed frequency fH) (fL=fH/1000).

As a result, when the electronic system SYS is stopped, the stress detection circuit 10 can detect the next transition to the operating state of the electronic system SYS with low power consumption.

Incidentally, even further slow the low-speed frequency fL, so that the asynchronous oscillation of the ring oscillator RO can be correctly captured, as shown in FIG. 9, when operating at a low-speed frequency fL, the oscillation output Fout of the ring oscillator RO by the frequency divider circuit DIC after slowing down to the frequency of 1/N, it may be configured to be captured by the synchronization buffer SB.

As a result, the power consumption of the semiconductor device 1 can be further reduced during the period of the standby state STB of the electronic system SYS.

Control circuit CN of FIG. 9 has a comparison circuit CPF considering the frequency state of the operation clock CLK.

Comparison circuit CPF, the operation of the stress detection circuit 10 performs a comparison in consideration of the number of counts of the clock as a unit.

That is, when the operating clock CLK is switched from a high-speed frequency fH to a low-speed frequency fL, even if the count number is the same, the count real time, the time of the low-speed operating clock (fL) than when the high-speed operating clock (fH), longer by (fH/fL).

Therefore, when the operation determination threshold OP1 is defined by the heat stress count at the time of the operation clock CLK of the high-speed frequency fH, at the time of the operation clock CLK of the low-speed frequency fL, the operation determination threshold (OP1) multiplied by (fH/fL).

Alternatively, the heat stress-information HSIs are compared by decreasing by (1/(fH/fL)).

Thus, even if the frequency of the operation clock is switched, it is possible to appropriately perform the comparison operation between the operation determination threshold and the heat stress information HSI.

Configuration Example and Modification Example of Cumulative Deterioration Stress Holding Circuit Some configuration examples and modifications of the main part of the cumulative deterioration stress amount holding circuit ST.

Figure 10:
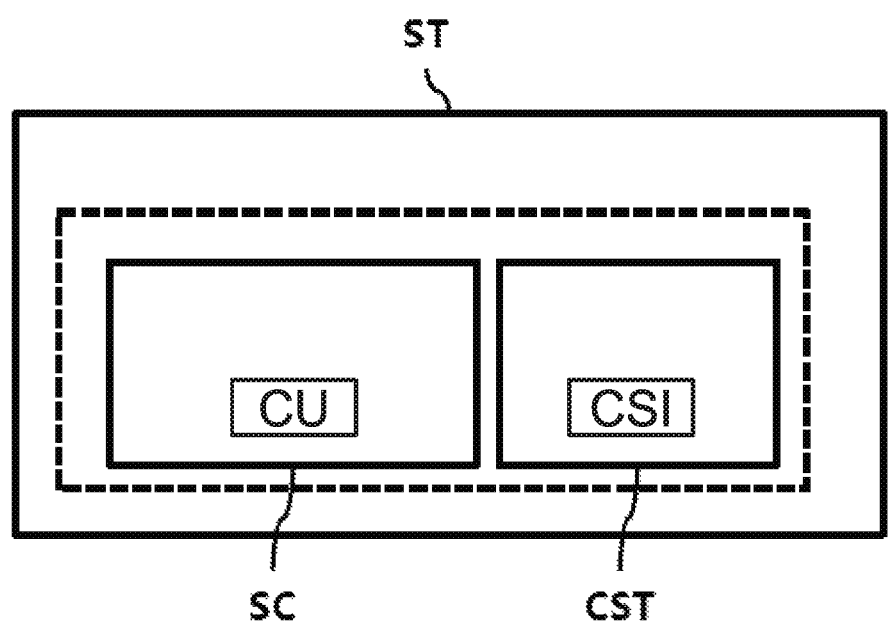
FIG. 10 is a diagram showing a configuration example of a main part of the cumulative deterioration stress holding circuit of FIG. 1.

FIG. 10 is a diagram showing a configuration example of a main part of the cumulative deterioration stress holding circuit of FIG.

As shown in FIG. 10, the cumulative deterioration stress amount holding circuit ST, the cumulative stress counter SC holds the cumulative stress count value CU, the switching count information holding circuit CST holds the switching count information CSI.

In this example, the cumulative stress count value CU is a count value obtained by accumulating the cumulative stress count value during the period of the operating state OP of the electronic system SYS and the cumulative stress count value during the period of the standby state STB of the electronic system SYS without distinguishing them from each other.

Figure 11:
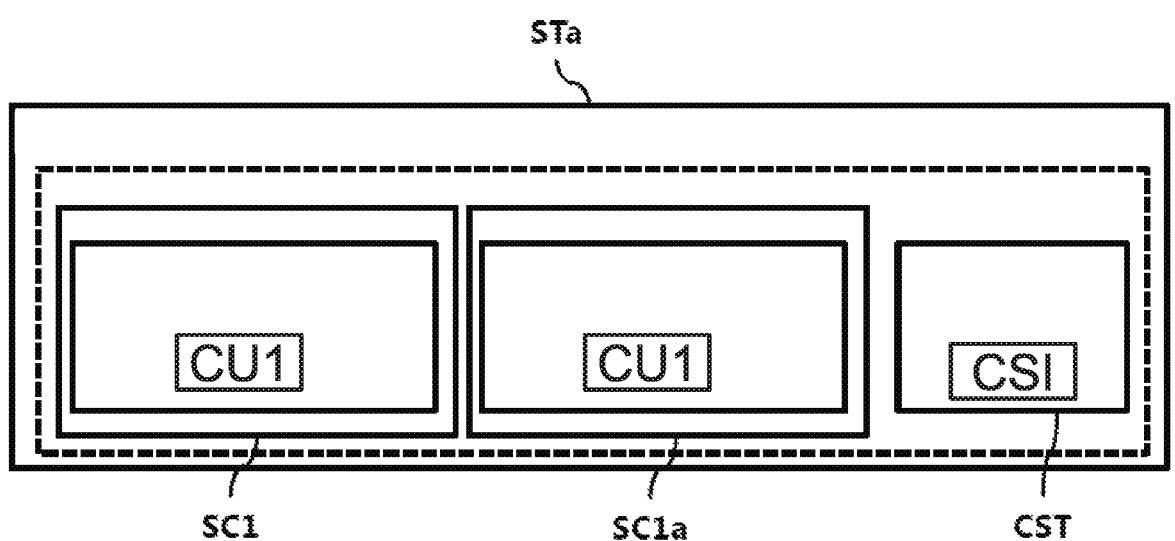
FIG. 11 is a diagram showing a configuration example of a main part of the cumulative deterioration stress amount holding circuit according to a first modification.

FIG. 11 is a diagram showing a configuration example of a main part of the cumulative deterioration stress amount holding circuit according to the first modification.

As shown in FIG. 11, the cumulative deterioration stress holding circuit STa includes a cumulative stress counter SC1, and the cumulative stress counter SC1a.

The cumulative stress counter SC1 holds the cumulative stress count value CU1 during the operating state OP of the electronic system SYS.

The cumulative stress counter SC1a holds the cumulative stress count value CU2 during the standby state STB of the electronic system SYS.

That is, the cumulative stress count value CU1 during the period of the operation state OP of the electronic system SYS and the cumulative stress count value CU2 during the period of the standby state STB of the electronic system SYS are distinguished from each other and held in the cumulative deterioration stress quantity holding circuit STa.

Cumulative deterioration stress amount holding circuit STa of FIG. 11, as compared with the cumulative deterioration stress amount holding circuit ST of FIG. 10, there is a merit that the amount of information is increased.

However, since two cumulative stress counter SC1, SC1a is required, it should be noted that the area and power dissipation of the semiconductor chip semiconductor device 1 is formed is increased.

Figure 12:
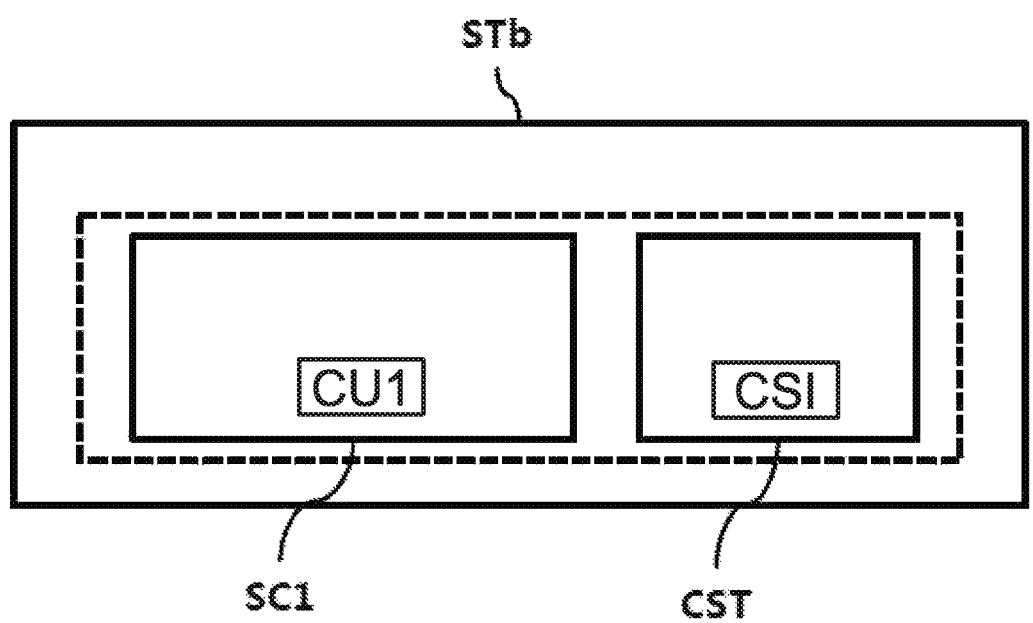
FIG. 12 is a diagram showing a configuration example of a main part of the cumulative deterioration stress amount holding circuit according to a second modification.

FIG. 12 is a diagram showing a configuration example of a main part of the cumulative deterioration stress amount holding circuit according to the second modification.

Cumulative deterioration stress holding circuit STb of FIG. 12 is different from the cumulative deterioration stress holding circuit STa of FIG. 11, in the cumulative deterioration stress holding circuit STb, the cumulative stress counter SC1a is not provided, only the cumulative stress counter SC1 is provided.

The cumulative stress counter SC1 holds the cumulative stress count value CU1 during the operating state OP of the electronic system SYS.

During the operating state OP of the electronic system SYS, the electronic system SYS is at a high temperature.

The amount of deterioration stress in the period of the high-temperature operating state OP is logarithmically larger in the same time period than in the period of the standby state STB.

Therefore, as long as the period of the standby state STB is not logarithmically longer than the period of the operating state OP, the cumulative deterioration stress amount during the period of the standby state STB can be ignored.

Accordingly, the cumulative deterioration stress amount holding circuit STb, as compared with the cumulative deterioration stress amount holding circuit ST of FIG. 10, during the period of the standby state STB, the heat stress intensity for detecting the next transition to the period of the operating state OP performing only continuous monitoring operation (detection operation), does not perform the counter operation related to the cumulative.

Thus, it is possible to reduce the power consumption during the period of the standby state STB of the cumulative deterioration stress amount holding circuit STb.

(Operation Procedure of Semiconductor Device)

Figure 13:
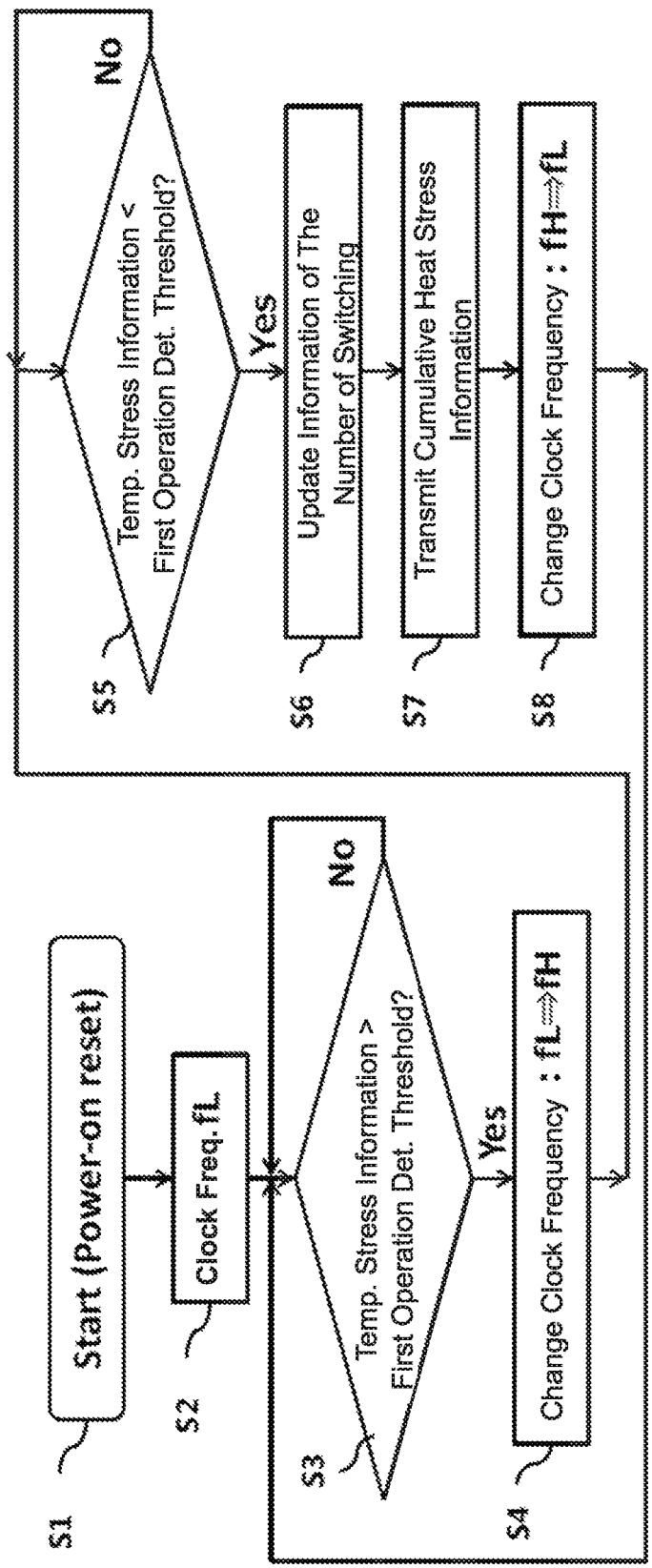
FIG. 13 is a diagram illustrating an operation procedure of the semiconductor device according to the embodiment.

FIG. 13 is a diagram for explaining an operation procedure of the semiconductor device according to the embodiment.

The power-on reset (Power on reset) is performed to start the semiconductor device 1 (step S1).

After the power-on reset (step S1), the stress detection circuit 10 in the semiconductor device 1 operates at an operation clock CLK of a low-speed frequency fL (step S2).

The stress detecting circuit 10 determines whether or not the heat stress information HSI is equal to or greater than the OP operation determination threshold (OP1) for each predetermined period (step S3).

If the heat stress information HSI is equal to or less than the OP-operation determination threshold value (OP1) (NO), the heat stress information HSI repeats step S3.

When the heat stress information HSI becomes more than the OP operation determination threshold (OP1) (Yes), the operation clock CLK of the stress detection circuit 10 switches from the operation clock of the low-speed frequency fL to the operation clock of the high-speed frequency fH (step S4).

After switching to the operation clock CLK of the high-speed frequency fH, the stress detecting circuit 10, together with accumulating the heat stress information HSI, the heat stress information HSI determines whether or not the OP operation determination threshold (OP1) or less for each predetermined period (step S5).

If the heat stress information HSI is not equal to or less than the first operation determination threshold value OP1 (NO), the heat stress information HSI repeats step S5.

When the heat stress information HSI becomes equal to or lower than the first operation determination threshold value OP1 (Yes), first, the switching count information CSI is updated (step S6).

Next, the wireless communication circuit 20, including the information of the updated switching count information CSI, transmits the cumulative heat stress information (heat stress amount HSV) (step S7).

Thereafter, the operation clock CLK of the stress detection circuit 10 is switched from the operation clock of the high-speed frequency fH to the operation clock of the low-speed frequency fL (step S8).

Then, the operation clock CLK of the low-speed frequency fL, the stress detecting circuit 10 heat stress information HSI continues the determination for each predetermined period of whether the first operation determination threshold OP1 or more (step S3).

According to the operation procedure of the semiconductor device, at the time of stopping the electronic system SYS (standby state STB), the stress detection circuit 10 operates at the operation clock CLK of the slow frequency fL.

The operating clock CLK of the slow frequency fL, that the heat stress information HSI has transitioned again above a predetermined level (first operation determination threshold OP1) is used only for the stress detection circuit 10 detects.

Therefore, the timing design of the operation clock such as a logic circuit in the semiconductor device 1 other than the stress detection circuit 10 may be implemented with respect to the operation clock CLK of the high-speed frequency fH for normal operation.

Therefore, the design of the semiconductor device 1 is facilitated.

(First Modification of the Stress Detection Circuit)

Figure 14:
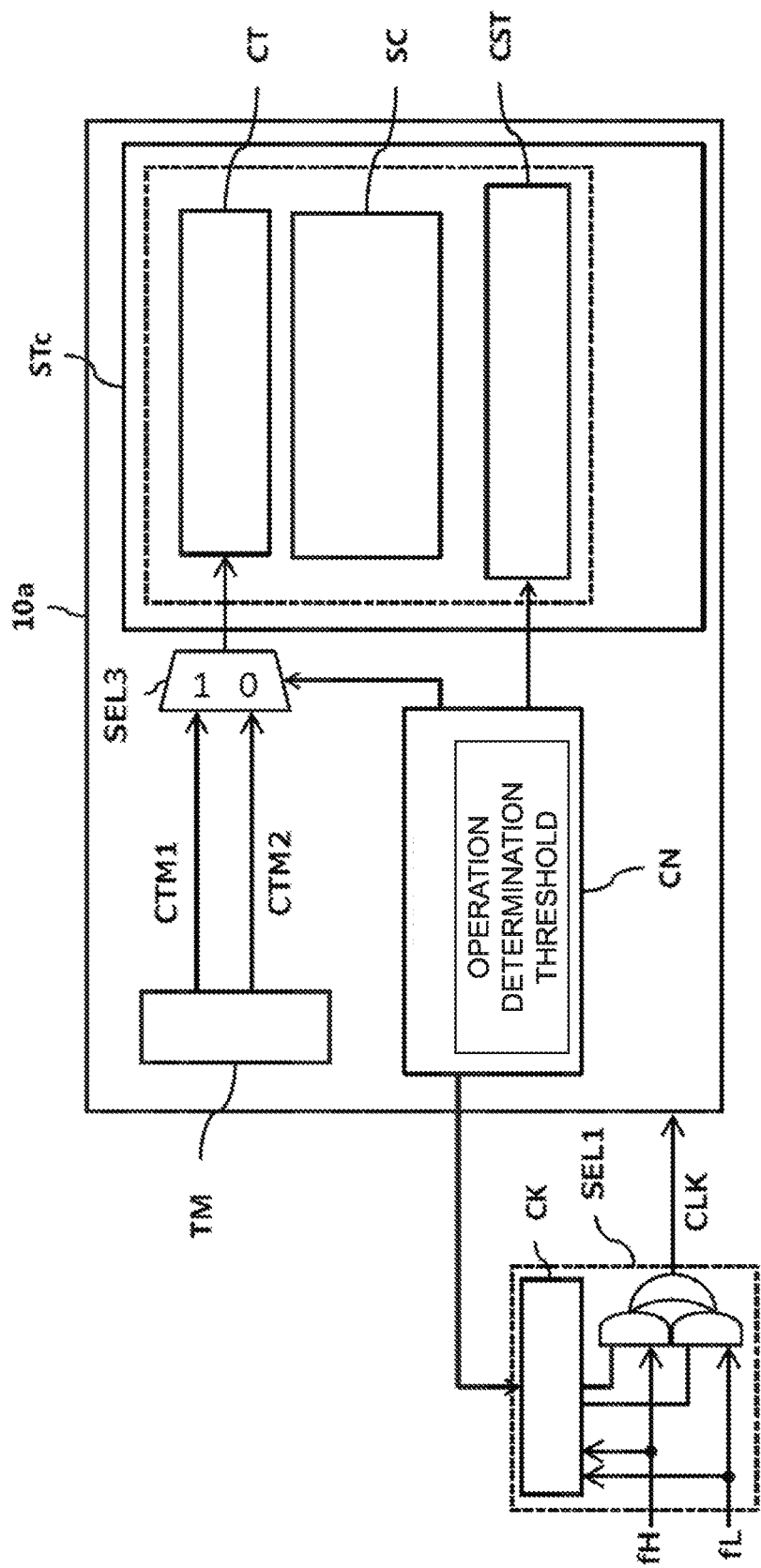
FIG. 14 is a diagram illustrating a configuration example of a stress detection circuit according to the first modification.

FIG. 14 is a diagram illustrating a configuration example of a stress detection circuit according to the first modification.

Stress detecting circuit 10a shown in FIG. 14 has a timer TM, a selection circuit SEL3, and a cumulative deterioration stress holding circuit STc.

Cumulative deterioration stress amount holding circuit STc, the cumulative deterioration stress amount holding circuit ST shown in FIG. 9, newly, the cumulative time holding circuit CT is provided.

In the stress detection circuit 10a of FIG. 14, the ring oscillator RO, the frequency divider circuit DIC, the selection circuit SEL2, synchronization buffer SB, intermittent operation control circuit IOC, the comparison circuit CPF is not shown.

The cumulative stress count value CU of the cumulative stress counter SC of the cumulative deterioration stress amount holding circuit STc is assumed to be a count value obtained by accumulating the cumulative stress count value during the period of the operation state OP of the electronic system SYS and the cumulative stress count value during the period of the standby state STB of the electronic system SYS without distinguishing them from each other, as described with reference to FIG. 10.

The selection circuit SEL3, when using the operation clock CLK of the high-speed frequency fH, selects the control signal CTM1 to be output by the timer TM, and inputs to the cumulative time holding circuit CT.

Further, the selection circuit SEL3, when using the operation clock CLK of the low-speed frequency fL, selects the control signal CTM2 to be output by the timer TM, and inputs the cumulative time holding circuit CT.

Cumulative time holding circuit CT is a circuit for holding the implementation number of the unit count operation as the cumulative time information.

As described in the comparison circuit CPF of FIG. 9, the unit count operation of the stress detection circuit 10a is performed for a predetermined time period of the clock period of the operation clock CLK.

Cumulative time holding circuit CT holds the number of execution of the unit count operation as the cumulative time information.

Therefore, when switching the operation clock CLK of the stress detection circuit 10a from the operation clock CLK of the high-speed frequency fH to the operation clock CLK of the low-speed frequency fL, even if the number of execution of the unit count operation recorded in the cumulative time holding circuit CT is the same, the real time of the unit count operation than when the operation clock CLK time of the operation clock CLK of the low-speed frequency fL is the high-speed frequency fH, it becomes longer by (fH/fL).

Such a difference as a real time causes a problem when accumulating the accumulated stress count value during the operation state OP of the electronic system SYS and the accumulated stress count value during the standby state STB of the electronic system SYS in one accumulated stress counter SC without distinguishing them from each other.

That is, since the cumulative stress count value during the period of the operation state OP of the electronic system SYS and the cumulative stress count value during the period of the standby state STB of the electronic system SYS cannot be discriminated, the deterioration stress at the time of the operation clock CLK of the low-speed frequency fL is erroneously recognized relatively (fH/fL) times as much as that at the time of the operation clock CLK of the high-speed frequency fH.

As shown in FIG. 14, the control signal CTM1, CTM2 from the timer TM in units of the count number of the clock frequency of the operation clock CLK is changed to match in terms of real-time.

That is, at the time of the operation clock CLK of the low-speed frequency fL, as compared with the time of the operation clock CLK of the high-speed frequency fH, the count number of 1/(fH/fL), the timer TM controls so as to generate a control signal CTM2.

In binary representation, the output bit digits are right-shifted by $\log_2$ (fH/fL).

For example, when fH=32 [MHz] and fL=32 [KHz], since log fH/fL to 10, the control signal CTM1 generated by the timer count value $2^{20}$ when using the operation clock CLK of the high-speed frequency fH is generated as a control signal CTM2 at the timer count value $2^{10}$ when using the operation clock CLK of the low-speed frequency fL.

In this manner, the absolute time is adjusted.

According to the stress detection circuit 10a, the clock frequency of the stress detection circuit 10a is switched, and even when the accumulated stress count value during the period of the operating state OP of the electronic system SYS and the accumulated stress count value during the period of the standby state STB of the electronic system SYS are accumulated in one accumulated stress counter SC without distinguishing them, the stress detection circuit 10a can be correctly operated.

(Modification of the Switching Count Information Holding Circuit)

Figure 15:
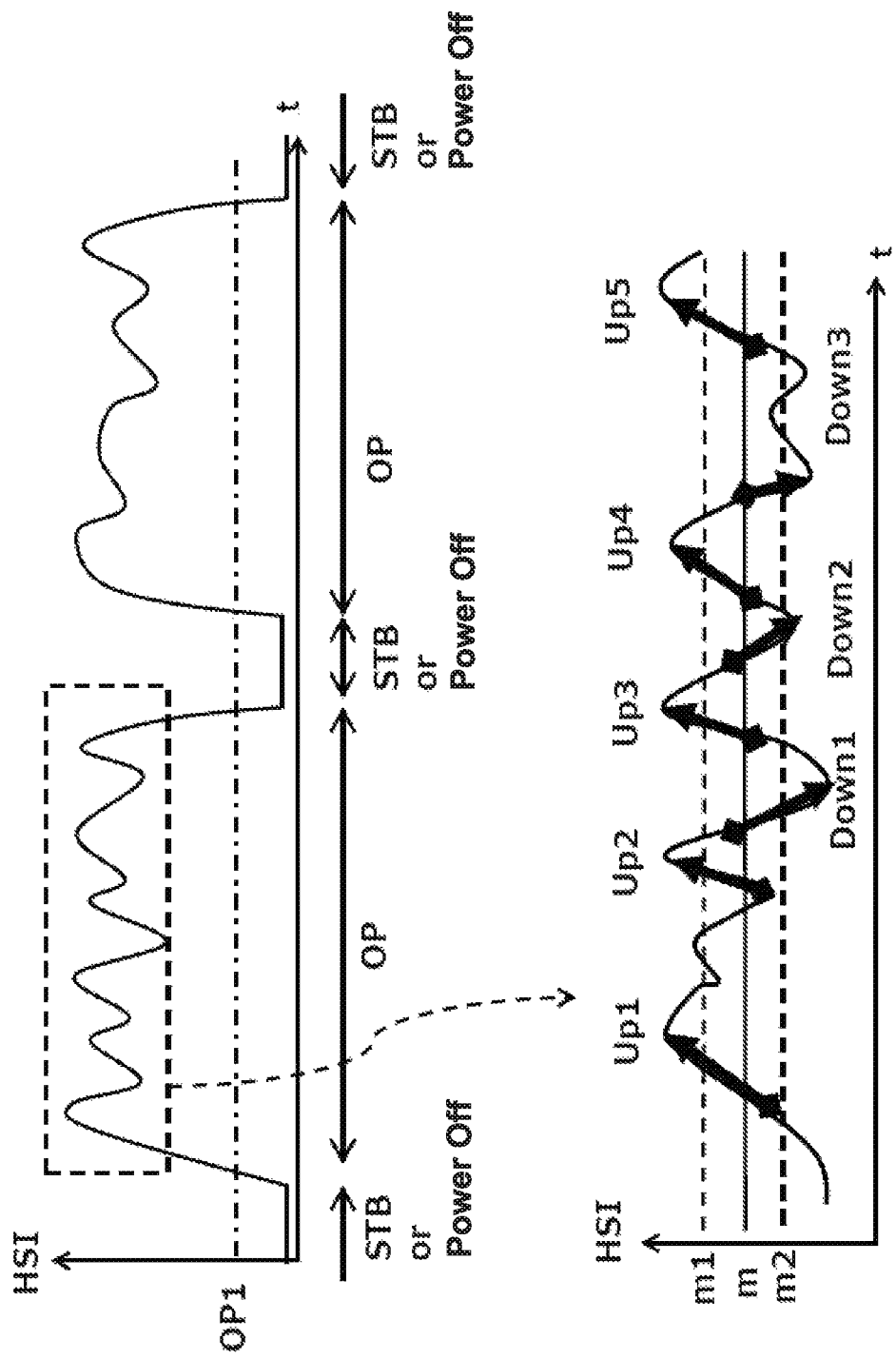
FIG. 15 is a diagram for explaining a modification of the switching count information holding circuit of FIG. 1.

FIG. 15 is a diagram for explaining a modification of the switching count information holding circuit of FIG.

Figure 16:
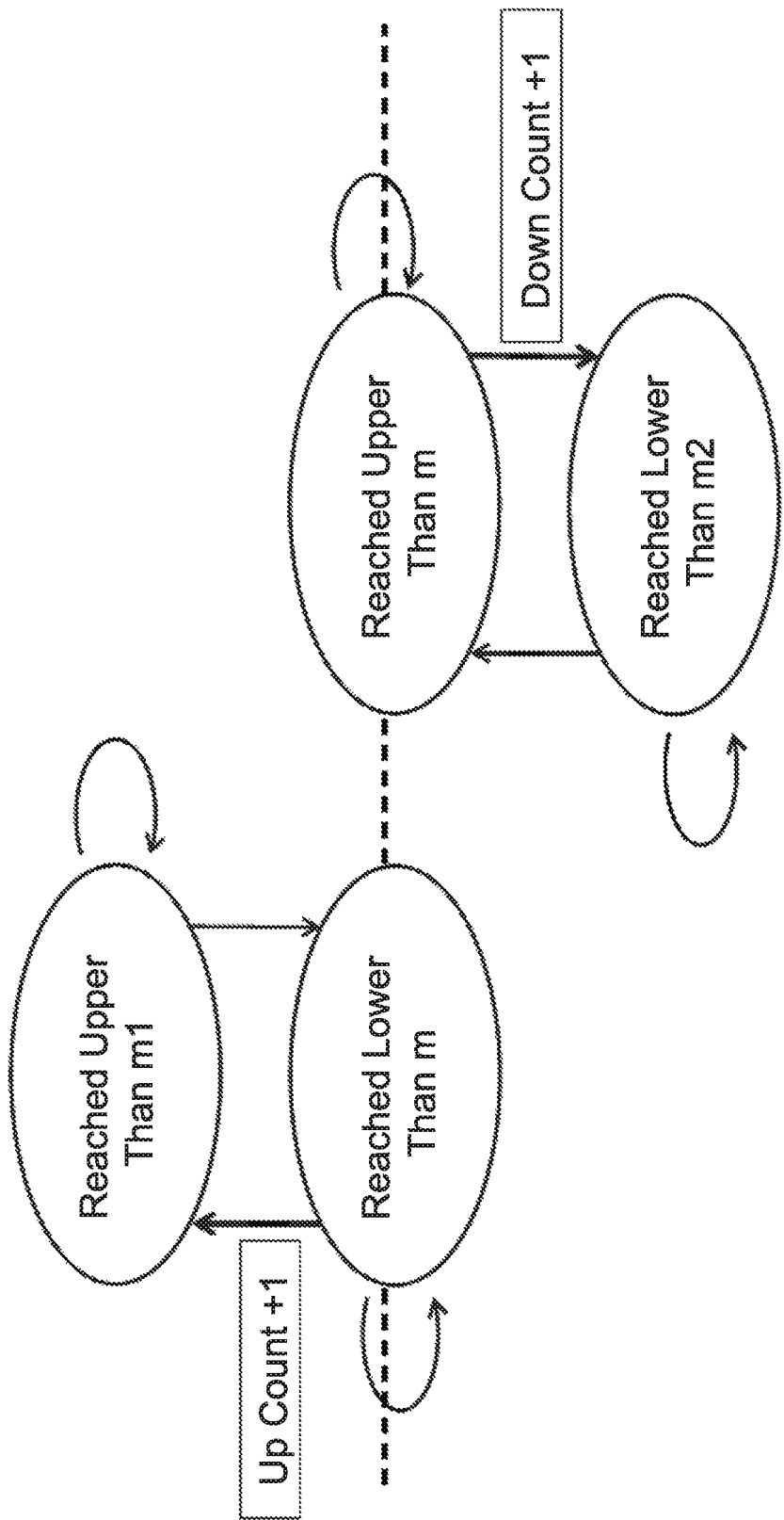
FIG. 16 is a diagram for explaining a state transition diagram of the switching count information holding circuit in a modification.

FIG. 16 is a diagram for explaining a state transition diagram of the switching count information holding circuit in a modification.

In FIG. 15, the vertical axis shows the heat stress information HSI, the horizontal axis shows the time t.

Deterioration stress related to the temperature rise and fall frequency shown in (Equation 4) may be influenced not only by the switching count of the operation period OP and the standby period STB but also by the heat stress rise and fall during the operation period OP.

Since the heat stress variation during the operation period OP is irregular, it is difficult to judge "up(rise)" or "down (fall)" during the operation period OP.

The median value m of the heat stress information HSI during the operation period OP and the standard deviation $\sqrt{(x-m)^2}$ can be used as thresholds for the determination of "up(rise)" and "down (fall)".

Here, the median value m is the cumulative count/count number, and represents the average of the enclosed values.

In the switching count information holding circuit CST, the threshold value m1 of the ascending Up is set to m1=m+$\sqrt{(x-m)^2}$, and the threshold value m2 of the descending Down is set to m2=m−$\sqrt{(x-m)^2}$.

The median m and std dev $\sqrt{(x-m)^2}$ are based on historical data.

For example, the median and standard deviation of the heat stress during the operating period OP from the previous operating state OP to the time of transition to the standby state STB can be used.

As shown in FIGS. 15 and 16, when the heat stress information HSI once transitions below the median value m and then transitions above the threshold value m1 of the rise Up, "rise Up" is counted.

When the heat stress information HSI once transitions above the median value m and then transitions below the threshold value m2 of the descending Down, the heat stress information HSI is counted as "falling down".

In FIG. 15, the rising up is determined as five times of Up1 to Up5.

In FIG. 15, the falling down is determined as three times of Down1 to Down3.

In this instance, the switching count information holding circuit CST holds the number of times of five ascending ups and the number of times of three falling down as the ascending and descending frequency information in the switching count information CSI.

According to a modification of the switching count information holding circuit, by defining the number of elevations of the heat stress during the operation period OP, it is possible to accurately obtain the number of elevations of the heat stress.

Therefore, in combination with the switching count information CSI of the operation period OP and the standby period STB, the state of the deterioration stress related to temperature rise and fall during the operation period OP period, can be more accurately grasped.

(Second Modification of the Stress Detection Circuit)

Figure 17:
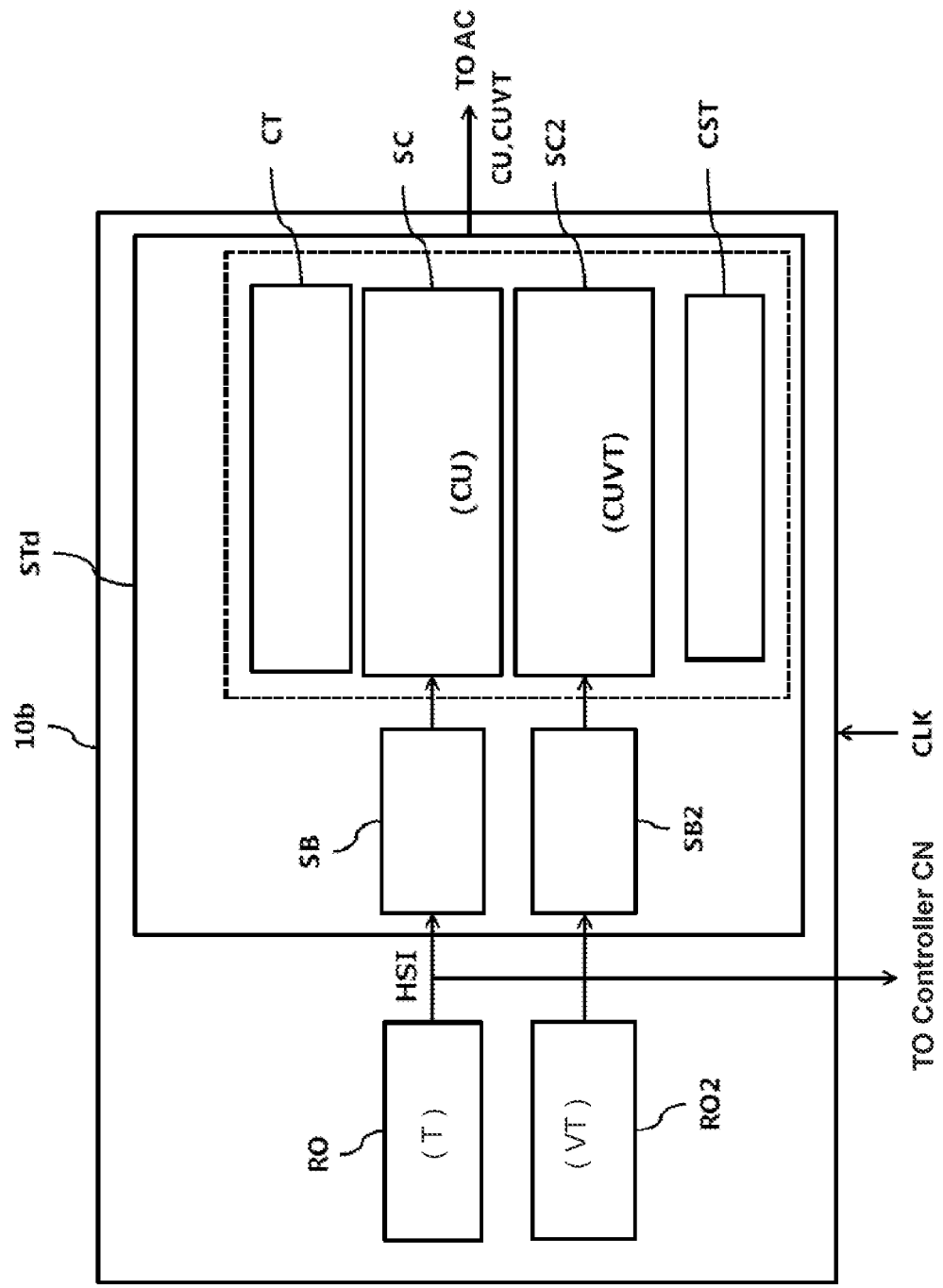
FIG. 17 is a diagram showing a stress detection circuit according to the second modification.

FIG. 17 is a diagram showing a stress detection circuit according to the second modification.

As shown in FIG. 17, the stress detecting circuit 10b includes a first ring oscillator RO, a second ring oscillator RO2, and a cumulative deterioration stress holding circuit STd.

Cumulative deterioration stress holding circuit STd includes a first synchronization buffer SB, a second synchronization buffer SB2, a cumulative time holding circuit CT, a first cumulative stress counter SC, a second cumulative stress counter SC2, and a switching count information holding circuit CST.

The first ring oscillator RO, the first synchronization buffer SB, and the first cumulative stress counter SC correspond to the ring oscillator RO, the synchronization buffer SB, and the cumulative stress counter SC shown in FIG. 1, respectively.

The accumulated time holding circuit CT corresponds to the accumulated time holding circuit CT shown in FIG. 14.

The stress detecting circuit 10b is further provided with a second ring oscillator R2, a second synchronizing buffer SB2, and a second cumulative stress counter SC2 in a configuration in which FIGS. 1 and 14 are combined.

As described in FIG. 1, the first ring oscillator RO is an oscillation circuit whose oscillation frequency is changed depending on the temperature.

On the other hand, the second ring oscillator RO2 depends on both the temperature- and voltage-dependent oscillation frequencies.

The oscillating outputs of the second ring oscillator RO2 are taken into the second synchronization buffers.

The second synchronization buffer SB2 acquires and temporarily holds the oscillation frequency of the second ring oscillator RO2 as the second heat stress information for each unit-count operation period.

The unit count operation period is a count sampling period of a constant period in which the temperature can be regarded as nearly constant.

The second cumulative stress counter SC2 continuously accumulates the second heat stress information outputted from the second synchronizing buffer SB2 and holds the second heat stress information as the cumulative stress count value CUVT.

Therefore, the first cumulative stress counter SC accumulates the first deteriorated stress amount (heat stress information HSI), which is remarkable only in temperature dependence, and holds the accumulated stress count value (also referred to as the first accumulated stress count value) CU.

The second cumulative deterioration stress counter SC2 accumulates the second deterioration stress amount (voltage and heat stress information) in which both the temperature dependence and the voltage dependence are remarkable, and holds the cumulative stress count value (also referred to as the second cumulative stress count value) CUTV.

The oscillation frequency of the second ring oscillator RO2 can be expressed as a function of temperature (T) and voltage (V).

Voltage (V) represents the power supply potential Vd and the ground potential Vs and the potential difference (Vd-Vs) supplied from the small battery BAT of FIG. 2 to the semiconductor device 1.

Assuming that the oscillation frequency of the second ring oscillator RO2 is F(T,V), F(T,V) is proportional to the voltage dependence f(V) and the exponent of the temperature inverse (exp(−Ea2/kT), so F(T,V) satisfies equation 6 below and depends greatly on T,V. Ea2 is the activation energy (temperature dependence coefficient).

$$F(T,V) \propto f(V)\exp(-Ea2/kT) \qquad (6)$$

The second ring oscillator RO2 has the property of Equation 6.

Assuming that the cumulative stress count value CU of the first cumulative stress counter SC is the count value Cnt1, the first cumulative stress counter SC is configured such that the count value Cnt1 of the predetermined period in which the temperature T is considered to be substantially constant is proportional to exp(−Ea1/kT).

Count-count Cnt1 is expressed as Cnt1=C1 exp(−Ea1/kT).

Here, C1 is a constant related to the temperature dependence of the count number.

When the cumulative stress count value CUTV of the second cumulative stress count SC2 and the count number Cnt2, the second cumulative stress count SC2, the temperature T, the voltage V is configured to be proportional to the count number Cnt2 of a predetermined period can be regarded as substantially constant f(V) exp(−Ea2/kT).

The count Cnt2 is represented by Cnt2=f(V) C2 exp(−Ea2/kT)=f(V) C2 {exp(−Ea1/kT)}$^{q2}$.

Here, C2 is a constant related to the temperature-dependence of the count number, and q2=Ea2/Ea1.

Here, the variation range of the correlation index Kq2 considering the variation of the voltage-dependence f(V) will be examined.

The correlation index Kq2 between the cumulative value of the count number Cnt1 (hereinafter, referred to as Cnt1 cumulative value) and the cumulative value of the count number Cnt2 (hereinafter, referred to as Cnt2 cumulative value) is expressed by the following equation 7.

$$Kq2 = \frac{(Cnt2 \text{ Cumulative Value})}{\{(Cnt1 \text{ Cumulative Value})^{q2}/N^{q2-1}\}} = \tag{7}$$

$$\frac{B(V)(\{\exp(-Ea1/kT)\}^{q2} \text{ Cumulative Value})}{[\{\exp(-Ea1/kT) \text{ Cumulative Value}\}^{q2}/N^{q2-1}]}$$

$$(f(Vchipmin)(C2/C1^{q2}) \le B(V) \le f(Vchipmax)((C2/C1^{q2}))).$$

Here, Cnt2 cumulative value, Cnt1 cumulative value is an actual measurement value, N is the cumulative number of execution of the unit count operation (counting operation of the period of a predetermined period in which the temperature can be regarded as substantially constant), the cumulative time holding it is an actual measurement value of the circuit CT.

B(V) is an unknown value depending on the voltage fluctuation history during the cumulative period.

Vchipmin and Vchipmax shows the minimum value Vchipmin and the maximum value Vchipmax of the variation of the power supply potential of the semiconductor device 1 (Vd).

f(Vchipmin) shows the voltage dependence of the oscillation frequency of the second ring oscillator RO2 in the minimum value Vchipmin of the power supply potential (Vd), f(Vchipmax) shows the voltage dependence of the oscillation frequency of the second ring oscillator RO2 in the maximum value Vchipmax of the power supply potential (Vd).

Therefore, the interrelationship indicator Kq2, so that the cumulative time holding circuit CT is correlated to the average voltage dependence f of the predetermined period to hold (V).

Further, the variation range of the correlation index Kq2 is obtained by considering the variation amount of the temperature T.

Here, ({exp(−Ea1/kT)}$^{q2}$ Cumulative Value)/[{exp(−Ea1/kT) Cumulative Value}/N$^{q2-1}$] in Equation 7 is 1 or more and less than Aq2.

Incidentally, Aq2 is a preset when considering the worst of variations in temperature T.

From the above, the variation range of the correlation index Kq2 considering the variation amount of the temperature T is as follows.

f(Vchipmin) (C2/C1$^{q2}$)≤Kq2≤f(Vchipmax)Aq2(C2/C1$^{q2}$)Kq2/(C2/C1), in accordance with the voltage state of the power supply voltage (Vd) of the semiconductor device 1, will vary between f (Vchipmin) to f (Vchipmax)Aq2.

Next, a method for determining the lifetime of a small battery BAT used in the electronic appliance ED of FIG. 2 will be described with reference to the stress detection circuit 10*b* of FIG. 17.

The determination of the lifetime of small batteries BATs is made using the interrelationship index Kq2.

Figure 18:
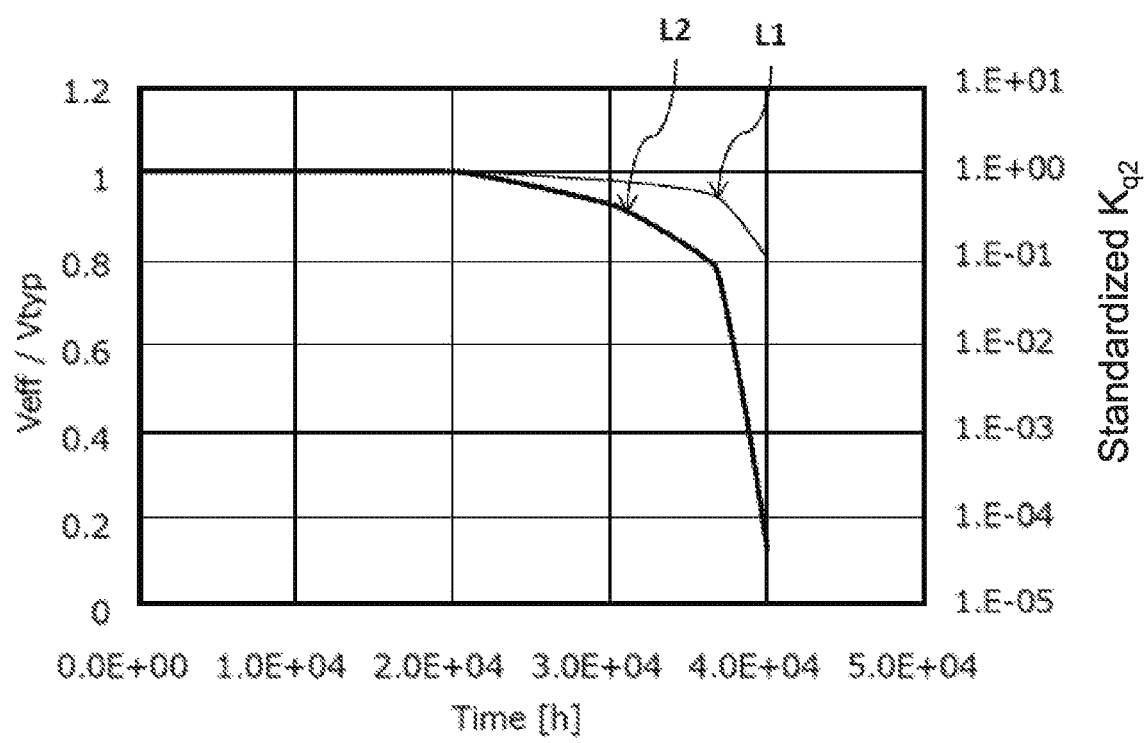
FIG. 18 is a diagram illustrating the lifetime and interrelationship indicators of a small battery utilized in an electronic appliance.

FIG. 18 is a diagram illustrating the lifetime and interrelationship indicators of a small battery utilized in an electronic appliance.

In FIG. 18, the left vertical axis shows the ratio (Veff/Vtype) between the actual outputted valid output voltage (Veff) and the standard voltage (Vtype) of the small battery BAT, the horizontal axis shows the time Time[h], the right vertical axis shows the value of the cross-relationship index Kq2 standardized.

In FIG. 18, the line L1 schematically shows the ratio (Veff/Vtype) between the effective output voltage (Veff) and the standard voltage (Vtype) of the small battery BAT, the output voltage of the small battery BAT decreases with the lapse of the use time, the life of the small battery BAT near, the effective output voltage of the small battery BAT becomes remarkable decrease.

In FIG. 18, the correlation index Kq2 correlated with the voltage-dependence f(V) changes as shown by a line L2.

Here, in calculating the normalized interrelationship index Kq2, the term ({exp(−Ea1/kT)}$^{q2}$ Cumulative Value)/[{exp(−Ea1/kT) Cumulative Value}$^{q2}$/N$^{q2-q}$] related to the temperature variation in Equation 7 is set to 1.

That is, Aq2 was set to 1.

As described above, since the voltage dependency f(V) of the deterioration stress quantity is expressed by V$^n$ or exp(BV), the normalized correlation index Kq2 logarithmically lowerings as the output voltage of the small-sized battery BAT decreases.

The interrelationship index Kq2 allows us to predict the lifetime of small batteries BATs relatively simply.

In the above explanation, the method of judging the lifetime of the small batteries BATs based on the time transition of the correlation index Kq2 has been described, but the time transition of the correlation index Kq2 can be regarded as the time transition of the second cumulative stress counts.

Therefore, based on the time transition of the second cumulative stress count value, it is possible to determine the life of the small battery BAT.

If the temperature dependence of the oscillation frequency of the first ring oscillator RO and the temperature dependence of the oscillation frequency of the second ring oscillator RO2 are the same, the cumulative stress count value CU may be subtracted from the cumulative stress count value CUTV to calculate the variation value related to the voltage dependence f(V), and based on the time transition of the variation value, the life of the small battery BAT may be determined.

As described in the description of FIG. 2, in place of the small battery BAT, even when the environmental power generation device that generates a voltage by light or vibration is used as the power source of the semiconductor device 1, the interrelationship indicator Kq2 can be used to detect the voltage state.

Then, the soundness of the voltage condition of the environmental power generating equipment can be judged using the interrelationship index Kq2.

That is, based on the time transition of the second cumulative stress count value, it is possible to determine the lifetime of the small battery BAT or the soundness of the voltage state of the environmental power generator.

If the output voltage of the environmental power generation device is less than a predetermined voltage, it is preferable to suspend wireless transmission from the wireless communication circuit 20 of the cumulative amount of deterioration stress, so as to wait for the voltage level of the output voltage of the environmental power generation device to recover above a predetermined voltage.

According to the second modification of the stress detection circuit, even if the power supply voltage of the small battery BAT is not continuously detected or monitored, the state of the output voltage of the small battery BAT or the environmental power generation device can be known from the value of the amount of deterioration stress, so that the power consumption of the storage area relating to the large number of data obtained by the continued detection or monitoring and the semiconductor device required for the processing can be reduced.

Compared to the case where the detection or monitoring of the output voltage of the small battery BAT or the environmental power generation device is performed once in a relatively long period, since the accumulated deterioration stress amount which is the value integrated in this period is used, the risk of making a false determination by erroneous measurement can be reduced.

The predetermined period for calculating the correlation index Kq2 may be a period from the transition from the standby state STB to the operation state OP until the transition from the operation state OP to the standby state STB (that is, a period of the operation state OP between the standby state STB and the standby state STB).

Thus, it is possible to detect the state of the output voltage (power supply potential (Vd)) of the small battery BAT at an appropriate frequency.

The correlation indicator Kq2 and other stress data are combined and wirelessly transmitted from the wireless communication circuits 20.

Alternatively, the receiver can calculate the correlation index Kq2 from Cnt1 cumulative value, which is the actual measurement value of the first cumulative stress count SC1, Cnt2 cumulative value, which is the actual measurement value of the second cumulative stress count SC2, and the actual measurement value N of the cumulative-time holding circuit CT.

In this case, the other stress information, Cnt1 cumulative value of the first cumulative stress counter SC1, and Cnt2 cumulative value of the second cumulative stress counter SC2, the measured value N of the cumulative time holding circuit CT, together with other stress information, wirelessly transmitted to the receiving side from the wireless communication circuit 20.

This makes it possible to replace the small battery BAT with a new small battery BAT in the stage before the battery BAT reaches its life.

Although the invention made by the present inventor has been specifically described above based on the embodiments, the present invention is not limited to the above-described embodiments, and it is needless to say that the present invention can be variously modified.

What is claimed is:

1. A semiconductor device comprising:
   a holding circuit including:
      a buffer configured to obtain a heat stress information having a temperature dependency every predetermined period;
      a stress counter configured to accumulate the heat stress information and hold the accumulated value as a cumulative stress count value;
   a control circuit including an operation determination threshold value;
   a wireless communication circuit,
   wherein the control circuit is configured to determine a state of heat stress selected from a first state that the heat stress information exceeds the operation determination threshold value or a second state that the heat stress information falls below the operation determination threshold value, and
   wherein the wireless communication circuit is configured to transmit a cumulative heat stress information calculated from the cumulative stress count value when the state of heat stress transits from the first state to the second state.

2. The semiconductor device according to claim 1,
   wherein the control circuit further includes an anomaly heat stress threshold value,
   wherein the wireless communication circuit is further configured to transmit the cumulative heat stress information when the heat stress information exceeds the anomaly heat stress threshold value.

3. The semiconductor device according to claim 1 further comprising a clock selecting circuit,
   wherein the holding circuit operates based on an operation clock,
   wherein the clock selecting circuit is configured to change a frequency of the operation clock based on the state of heat stress, and
   wherein the frequency of the operation clock of the second state is lower than that of the first state.

4. The semiconductor device according to claim 3,
   wherein the holding circuit is further configured to hold a switching information indicating the number of switching between the first state and the second state.

5. The semiconductor device according to claim 3,
   wherein the control circuit is further configured to perform detection that the heat stress information exceeds the anomaly heat stress threshold value by the operation clock of the second state.

6. The semiconductor device according to claim 3,
   wherein the control circuit is further configured to count the number of the operation clock based on a counting amount,
   wherein the counting amount is configured to be set based on the frequency of the operation clock, and
   wherein the holding circuit is further configured to input the number of the counts of the operation clock.

7. The semiconductor device according to claim 4,
   wherein the switching information includes a rise/fall information indicating the number of rising and falling of the heat stress information at the first state;
   wherein the rise/fall information is generated by determine rising or falling of the heat stress information based on median and deviation of a transition history of the heat stress information.

8. An electronic device comprising:
   the semiconductor device according to claim 1;
   an antenna connected to the wireless communication circuit of the semiconductor device; and
   a power generation device configured to supply a power supply voltage and a ground voltage with the semiconductor device,
   wherein the power generation device comprises a battery or an environmental power generation device.

9. An electronic system comprising:
   the electronic device according to claim 8; and
   an appliance on which the electronic device mounted.

10. An electronic device according to claim 8,
wherein the buffer of the holding circuit is further configured to obtain a second heat stress information having both a temperature dependency and a voltage dependency,
wherein a holding circuit further includes a second stress counter configured to accumulate the second heat information as a second stress count value, and
wherein the control circuit is further configured to determine a remaining capacity of the battery or a voltage normalcy of the environmental power generation device.

11. An electronic system comprising:
the electronic device according to claim 10; and
an appliance on which the electronic device mounted.

12. A semiconductor device comprising:
a stress detection circuit; and
a wireless communication circuit,
wherein the stress detection circuit comprises:
  a first ring oscillator whose oscillation frequency has a temperature dependency;
  a cumulative deterioration stress amount holding circuit; and
  a control circuit having an operation determination threshold,
wherein the cumulative deterioration stress amount holding circuit including:
  a first synchronization buffer configured to detect the oscillation frequency of the first ring oscillator and store that as a heat stress information every unit counting period; and
  a first cumulative stress counter configured to accumulate the heat stress information and hold the accumulated value as a first cumulative stress count value,
  a control circuit having an operation determination threshold,
wherein the control circuit is configured to:
  determine a state of heat stress selected from a first state that the heat stress information exceeds the operation determination threshold value or a second state that the heat stress information falls below the operation determination threshold value, and
  start transmission of a cumulative heat stress information calculated from the first cumulative stress count value when the state of heat stress transits from the first state to the second state.

13. The semiconductor device according to claim 12, further comprising:
a first clock generating circuit configured to generate a first clock signal having a first clock frequency;
a second clock generating circuit configured to generate a second clock signal having a second clock frequency slower than the first clock frequency;
a clock selecting circuit performed by the control circuit,
wherein, the heat stress information is the first state, the clock selecting circuit supplies the first clock signal as an operation clock with the stress detection circuit, and
wherein, the heat stress information is the second state, the clock selecting circuit supplies the second clock signal as the operation clock with the stress detection circuit.

14. The semiconductor device according to claim 13,
wherein the stress detection circuit includes a frequency divider and a divider selecting circuit,
wherein the frequency divider is configured to divide an output of the first ring oscillator, and
wherein the divider selecting circuit is configured to select the output of the first ring oscillator or a output of the frequency divider and output to the first synchronization buffer.

15. An electronic device comprising:
the semiconductor device according to claim 13,
an antenna connected to the wireless communication circuit of the semiconductor device; and
a power generation device configured to supply a power supply voltage and a ground voltage with the semiconductor device,
wherein the power generation device comprises a battery or an environmental power generation device.

16. An electronic system comprising:
the electronic device according to claim 15; and
an appliance on which the electronic device mounted.

17. The semiconductor device according to claim 13,
wherein the stress detection circuit includes a second ring oscillator whose oscillation frequency has a temperature dependency and a voltage dependency,
wherein the cumulative deterioration stress amount holding circuit includes:
  a second synchronization buffer configured to detect the oscillation frequency of the second ring oscillator and store that as a second heat stress information every unit counting period; and
  a second cumulative stress counter configured to accumulate the oscillation frequency of the second ring oscillator as a second heat stress information and hold the accumulated value as a second cumulative stress count value.

18. An electronic device comprising:
the semiconductor device according to claim 17,
an antenna connected to the wireless communication circuit of the semiconductor device; and
a power generation device configured to supply a power supply voltage and a ground voltage with the semiconductor device,
wherein the power generation device comprises a battery or an environmental power generation device.

19. An electronic system comprising:
the electronic device according to claim 18; and
an appliance on which the electronic device mounted.

* * * * *